(12) United States Patent
Hauck

(10) Patent No.: US 6,977,932 B1
(45) Date of Patent: Dec. 20, 2005

(54) SYSTEM AND METHOD FOR NETWORK TUNNELING UTILIZING MICRO-FLOW STATE INFORMATION

(75) Inventor: Scott Hauck, Bloomington, MN (US)

(73) Assignee: Caspian Networks, Inc., San Jose, CA (US)

( * ) Notice: Subject to any disclaimer, the term of this patent is extended or adjusted under 35 U.S.C. 154(b) by 815 days.

(21) Appl. No.: 10/051,864

(22) Filed: Jan. 16, 2002

(51) Int. Cl.[7] .................... H04L 12/56; H04L 12/28; H04J 3/16; G01R 31/08
(52) U.S. Cl. ................. 370/392; 370/235; 370/401; 370/469
(58) Field of Search .................. 370/401, 469, 370/235, 229, 230, 386, 389, 391, 392, 400

(56) References Cited

U.S. PATENT DOCUMENTS

| | | | |
|---|---|---|---|
| 6,542,466 B1 * | 4/2003 | Pashtan et al. ............. | 370/235 |
| 6,574,195 B2 * | 6/2003 | Roberts ...................... | 370/235 |
| 2003/0043792 A1 * | 3/2003 | Carpini et al. ............. | 370/386 |
| 2003/0112756 A1 * | 6/2003 | Le Gouriellec et al. .... | 370/230 |
| 2004/0013089 A1 * | 1/2004 | Taneja et al. ............... | 370/235 |
| 2004/0028064 A1 * | 2/2004 | Cetin et al. ................. | 370/409 |
| 2004/0174865 A1 * | 9/2004 | O'Neill ...................... | 370/352 |
| 2005/0100009 A1 * | 5/2005 | Botvich ..................... | 370/389 |

* cited by examiner

Primary Examiner—Duc Ho
(74) Attorney, Agent, or Firm—Martine Penilla & Gencarella, LLP

(57) ABSTRACT

Network tunneling methods and apparatus utilizing flow state information are provided. A router includes an ingress linecard having logic that selects a particular network tunnel for a received micro-flow. The ingress linecard further includes logic that selects a particular egress linecard and a particular port to utilize for transmitting the micro-flow. The router also includes an aggregate flow block that includes tunnel specific information for the selected network tunnel. The tunnel specific information includes but is not limited to label action and outgoing label(s), Layer 2 tunneling action or Layer 3 actions. The aggregate flow block further includes statistics for the selected network tunnel. In addition, the router includes a flow block having flow state information for the micro-flow. The flow block also includes an identifier that associates the flow block with the aggregate flow block.

32 Claims, 14 Drawing Sheets

SYSTEM AND METHOD FOR NETWORK TUNNELING UTILIZING MICRO-FLOW STATE INFORMATION

CROSS REFERENCE TO RELATED APPLICATIONS

This application is related to U.S. patent application Ser. No. 09/552,278, filed on Apr. 19, 2000, entitled "MICRO-FLOW MANAGEMENT," which is hereby incorporated by reference in its entirety. This application also is related to U.S. patent application Ser. No. 09/699,199, filed Oct. 27, 2000, entitled "SYSTEM AND METHOD FOR UTILIZATION BASED MICRO-FLOW LABEL SWITCHING," which is hereby incorporated by reference in its entirety.

BACKGROUND OF THE INVENTION

1. Field of the Invention

This invention relates generally to computer networking, and more particularly to methods and systems for using micro-flow state information in conjunction with network tunneling techniques.

2. Description of the Related Art

Due to high customer demand for increasingly reliable and differentiated services, today's Internet Service Providers (ISPs) are constantly faced with the challenge of adapting their networks to support increased customer demand and growth. As a result, many ISPs currently utilize network tunneling techniques to interconnect multiple transit devices.

One such network tunneling technique is Multi-protocol Label Switching (MPLS), which provides Layer 2 switching by assigning micro-flows to aggregate flows along larger paths, called Label Switched Paths (LSPs). Thus, a conventional MPLS network integrates Open Systems Interconnection (OSI) based Layer 2 switching with OSI based Layer 3 routing.

A conventional MPLS network includes a plurality of Label Switched Routers (LSRs), each of which includes a control component and a forwarding component. The control component uses a standard routing protocol to exchange information with other LSRs to build and maintain a forwarding table. When packets arrive, the forwarding component searches the forwarding table maintained by the control component to make a routing decision for each packet. Specifically, the forwarding component examines information included in the packet's header, searches the forwarding table for a match, and directs the packet from the input interface to the output interface across the system's switching fabric.

The header of each packet is generally given a label, which is a short, fixed length value that identifies a Forwarding Equivalence Class (FEC) for the packet. Each FEC is a set of packets that are forwarded over the same path through a network, even if the individual packets' ultimate destinations are different. Label switches use the FEC to determine which LSP to utilize for transmitting the packet. It should be noted that a plurality of FECs may be mapped to the same LSP, and likewise, more than one LSP may be mapped to each FEC. The packet is then transmitted using the selected LSP, which defines an ingress-to-egress path through the network domain that is followed by all packets assigned to a specific FEC.

In the core of the network, LSRs ignore the packet's network layer header and simply forward the packet using the packet's label. Basically, when a labeled packet arrives at a label switch, the forwarding component uses the input port number and label to perform an exact match search of its forwarding table. When a match is found, the forwarding component retrieves the next hop address from the forwarding table and directs the packet to the outbound interface for transmission to the next hop in the LSP.

This allows for the OSI interconnection Layer to by-pass having to look in the individual Layer 3 destinations and to simply route based upon the MPLS labels. However, conventional MPLS networks generally do not maintain flow state information on each individual micro-flow within a particular LSP. As such, Quality of Service (QoS) in the IP network typically cannot be adequately provided. Such failure to provide QoS results in such problems as microflows within a tunnel (e.g., LSP) cannot have different QoS characteristics. In addition, routers that have some type of a switching fabric also may have some difficulty switching a large tunnel (e.g., LSP) within their switching fabric because the tunnels may exceed the bandwidth (e.g., 2.5 Gbps) of internal fabric links, thereby precluding the router from switching a tunnel that is larger than that bandwidth (e.g., 2.5 Gbps). Service providers may wish to offer premium services defined by Service Level Agreements (SLAs) to expedite traffic from certain customers or applications. QoS in IP networks gives devices the intelligence to preferentially handle traffic as dictated by network policy. Further, QoS mechanisms give network managers the ability to control the mix of bandwidth, delay, jitter, and packet loss in the network.

To adequately provide QoS, a network generally should maintain flow state information for each micro-flow routed through the network. This flow state information generally should be maintained in memory, using a separate entry for each micro-flow. However, policing millions of flow state data entries, one for each micro-flow, presents a prohibitively time consuming and processor intensive task in a conventional MPLS network domain.

For example, to maintain adequate QoS, statistics should be maintained for each micro-flow transmitted along each LSP. To accomplish this using a conventional MPLS network millions of flow state data entries would need to be searched to determine which entries pertain to a particular LSP. Upon finding thousands of entries that are of interest, the prior art system would then need to add up all the bytes, packets, and errors that relate to the LSP. When multiple LSPs are present, the task is multiplied by the number of LSPs.

A similar situation occurs when altering the path of an LSP in a conventional MPLS network. To alter the path of an LSP while maintaining flow state information for each micro-flow, the prior art system generally would need to search through millions of flow state data entries to find particular entries that are associated with the LSP being altered. Upon finding thousands of entries associated with the LSP, the system would alter each entry reflect the LSP change. For the above reasons, conventional MPLS systems generally do not maintain flow state information on a per micro-flow basis, and as a result, generally do not provide adequate QoS.

In view of the foregoing, there is a need for systems and methods for providing network tunneling utilizing flow state information. The system should maintain flow state information on a per flow basis, yet still be usable with network tunneling techniques.

SUMMARY OF THE INVENTION

Embodiments of the present invention fills these needs by providing a network tunneling system that maintains flow state information for various QoS characteristics by utilizing aggregate flow blocks, which maintain LSP information, in conjunction with micro-flow block information. Broadly speaking, a flow block stores flow state information for a micro-flow (e.g., a uniquely identifiable set of data signals that typically have the same open system interconnection model network layer and transport layer characteristics). A tunnel identifier for the micro-flow is stored in the flow block. The tunnel identifier identifies a network tunnel to use for transmitting the micro-flow. An aggregate flow block is indexed using the tunnel identifier. The aggregate flow block includes, among other information, tunnel specific information for the selected network tunnel. The micro-flow is transmitted using the selected network tunnel based on the tunnel specific information.

In another embodiment, a switch that is capable of providing network tunneling utilizing flow state information is disclosed. The switch includes an aggregate flow block, which includes tunnel specific information for a particular network tunnel, and a flow block that includes flow state information for a micro-flow. The flow block further includes an identifier that associates the flow block with the aggregate flow block.

A method for network tunneling utilizing flow state information is disclosed in a further embodiment of the present invention. A data packet of a micro-flow is received at an ingress linecard (e.g., routing element) of a switch. A flow block having flow state information for the micro-flow is created. A tunnel identifier for the micro-flow is stored in the flow block. The tunnel identifier identifies a particular network tunnel to use when transmitting the data packet across the network domain. A particular output port on a specific egress linecard (e.g., routing element) is determined for transmitting the micro-flow, and the data packet is transmitted to the specific egress linecard. An aggregate flow block is indexed using the tunnel identifier. The aggregate flow block includes tunnel specific information for the selected network tunnel. Each data packet of a micro-flow is transmitted along the selected network tunnel using the particular output port based on the tunnel specific information.

In a further embodiment of the present invention, a further switch capable of network tunneling utilizing flow state information is disclosed. The switch includes an ingress linecard having logic that selects a particular network tunnel for a received micro-flow. The ingress linecard further includes logic that selects a particular egress linecard and a particular port to utilize for transmitting the micro-flow. The router also includes an aggregate flow block that includes tunnel specific information for the selected network tunnel. The aggregate flow block further includes statistics for the selected network tunnel. In addition, the switch includes a flow block having flow state information for the micro-flow. The flow block also includes an identifier that associates the flow block with the aggregate flow block.

The advantage of aggregate flow blocks of embodiments of present invention is the ability to provide a switch with the ability to combine flow state information with other information (e.g., LSP utilization), thereby providing a mechanism for the micro-flows associated with an aggregate flow block to all be processed in a similar manner (e.g., LSP statistics collection, LSP alteration, and LSP teardown) without introducing prohibitively time consuming and processor intensive tasks to the network system.

Without the ability to utilize aggregate flow blocks, processing large numbers of micro-flows would be prohibitively time consuming and processor intensive. The aggregate flow block avoids the need to search millions of flow blocks to identify flow blocks having certain micro-flow characteristics (e.g., QoS). Other aspects and advantages of the invention will become apparent from the following detailed description, taken in conjunction with the accompanying drawings, illustrating by way of example the principles of the invention.

BRIEF DESCRIPTION OF THE DRAWINGS

The embodiments of the present invention, together with further advantages thereof, may best be understood by reference to the following description taken in conjunction with the accompanying drawings in which.

DETAILED DESCRIPTION OF EMBODIMENTS OF THE PRESENT INVENTION

Figure 1A:
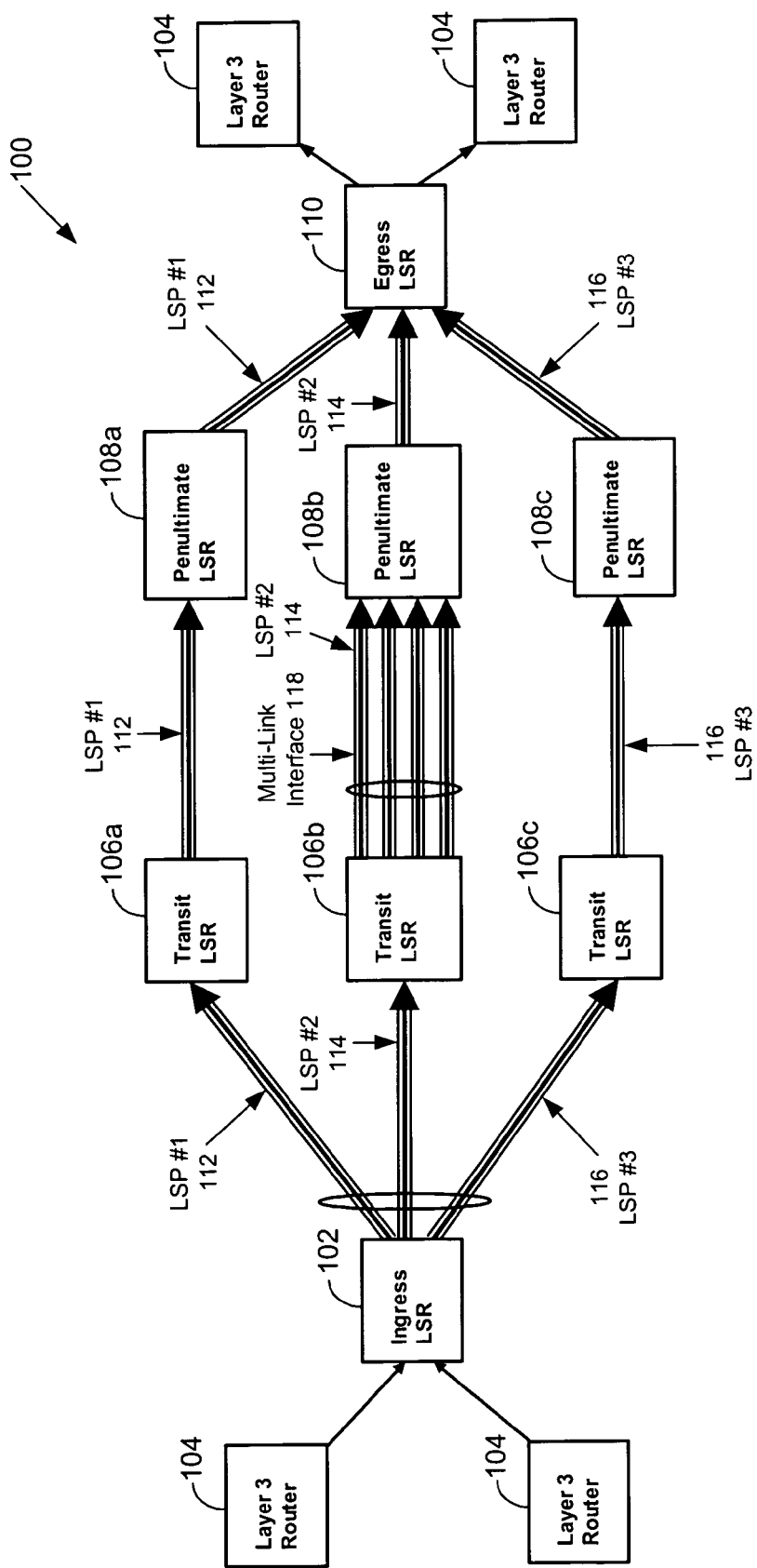
FIG. 1A is an illustration of an exemplary segment of a micro-flow LSP network domain and specifically an ingress linecard of label switched router (LSR), in accordance with an embodiment of the present invention.

Embodiments of present invention are disclosed for a network tunneling system that maintains flow state information. In particular, the embodiments of the present invention utilize aggregate flow blocks, which maintain information (e.g., LSP information), in conjunction with flow blocks, which maintain flow state information for micro-flows (e.g., a uniquely identifiable set of data signals that typically have the same open system interconnection model network layer and transport layer characteristics, such as protocol type, source address, destination address, TCP/UDP source port number and TCP/UDP destination port number), to provide network tunneling based on state information.

In the following description, numerous specific details are set forth in order to provide a thorough understanding of various embodiments of the present invention. It will be apparent, however, to one skilled in the art that additional embodiments of the present invention may be practiced without some or all of these specific details. In addition, the term switch will be used synonymously with router in the following description as a general reference to a device that assists in the transporting of data signals from one point in a network to another point in a network. Further, the term quality of service (QoS) will be used to refer to any service definition related information that can be associated with a data packet, micro-flow, or LSP. For example, QoS can refer to transmission rate information, delay variation information or jitter information. In addition, QoS can refer to the ability to define a level of performance in a data communications system. For example, networks often specify modes of service that ensure optimum performance for traffic such as real-time voice and video.

Furthermore, although the following description focuses on Internet protocol ("IP") data packets for illustrative purposes, the embodiments of the present invention may apply equally to other protocols, such as ATM, frame relay, etc.

By way of background, when data is sent from a source network element (e.g., ingress linecard) to a destination network element (e.g., egress linecard) via a network, the data is divided into individual data packets that are individually routed through the network. When eventually received by the destination network element, the data packets are collated back into the original form of the data.

To route data at increased transfer speeds, an embodiment of the present invention converts received data packets into micro-flows and forwards them via the micro-flow LSP network domain. Each micro-flow is a group of data packets (e.g., IP data packets) from a single transmission, wherein each data packet in a single micro-flow includes the same source address, destination address, source port, destination port, and protocol type. In addition, each packet in the micro-flow follows the preceding packet by no more than a predetermined amount of time (e.g., 2 milliseconds (ms)).

Figure 2A:
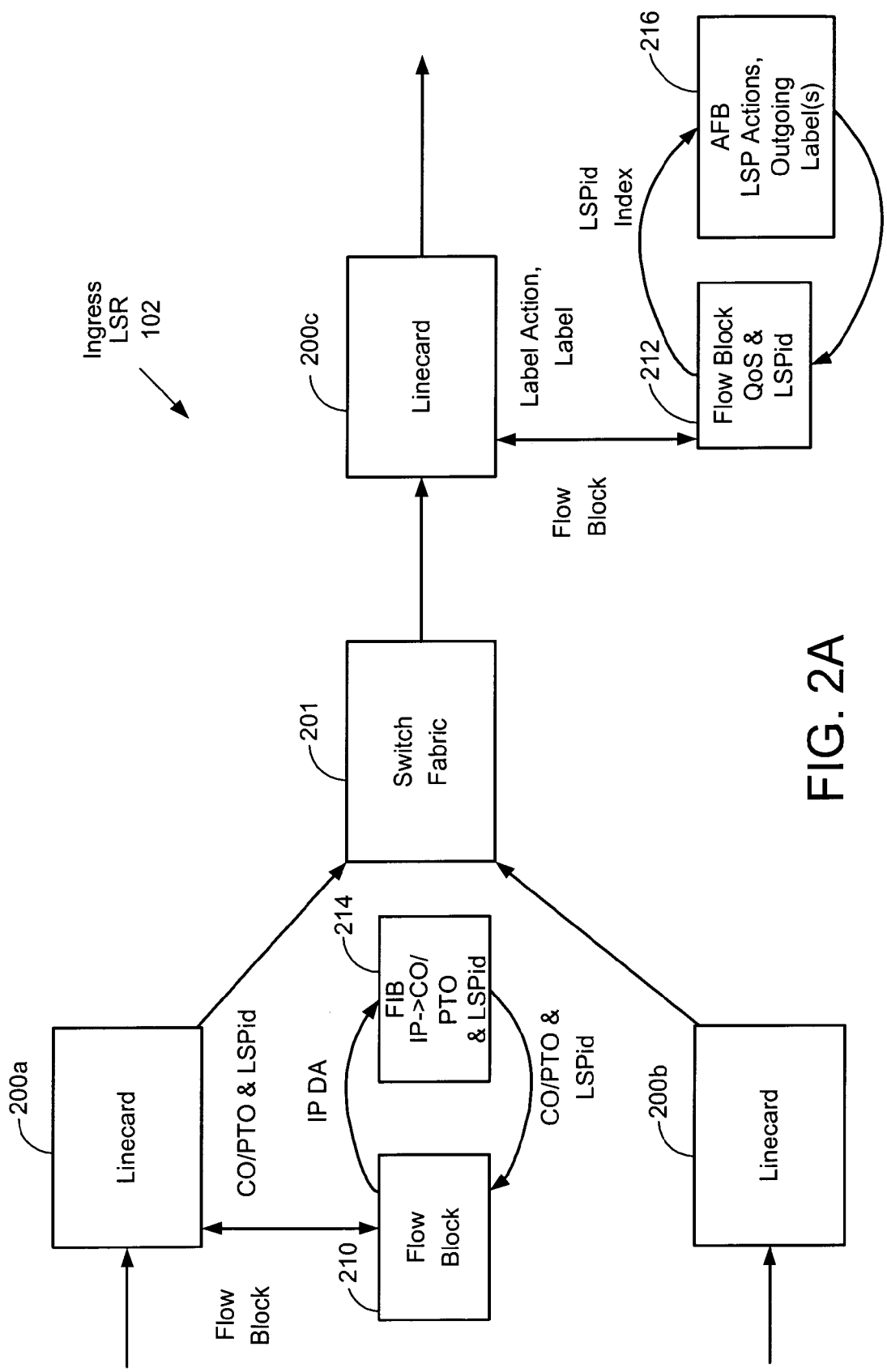
FIG. 2A is a high level block diagram illustrating several linecards within an LSR of an embodiment of the present invention.
Figure 2B:
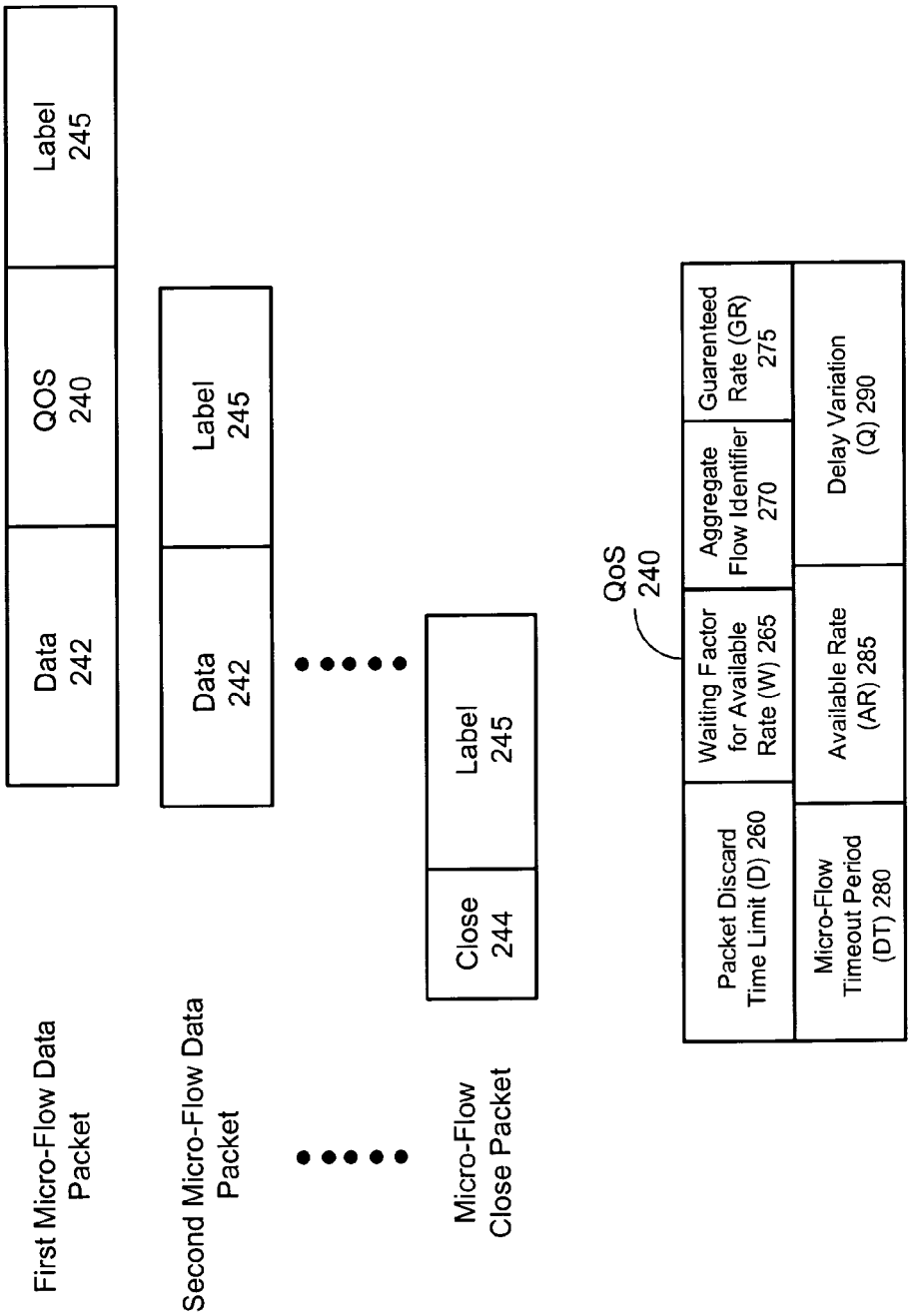
FIGS. 2B and 2C are high level block diagrams illustrating a micro-flow and the relationship of the micro-flow with an aggregate flow block.

FIG. 2B illustrates a high level block diagram of one embodiment of a micro-flow. The first data packet of a micro-flow includes a label field 245, which identifies a micro-flow based on the hashing of a packet header field, a QoS field 240, and a data field 242. Thereafter, each subsequent data packet of the same micro-flow includes a label field 245, and a data field 242. Finally, a close packet includes a label field 205, and a close field 244. The close field 244 of the close packet is used to instruct a switch to terminate an already established micro-flow that is present in the network. In summary, on a first packet, a hash value (using label, QoS, data) resolves to a micro-flow which has not yet been created. Forwarding then takes the label and performs a lookup which results in an aggregate flow block. The micro-flowblock is then created and filled in by referring to the AFB. Subsequent packets then hash to the micro-flowblock which in turn refers to the AFB.

Within the above described micro-flow, the data field 242 generally includes the content of the data packet received at the ingress label switch of the micro-flow LSP network domain. The data field 242 may include either the entire data packet or a portion of the data packet with the remaining data packets in subsequent data packets of the micro-flow. To create a micro-flow data packet, an embodiment of the present invention adds the label field 245, and the QoS field 240 to the first data packet received.

The label field 245 is used by the micro-flow LPS network domain to differentiate data packets of one micro-flow from data packets of another micro-flow, and to associate each data packet in a micro-flow with its assigned QoS characteristics. Generally, the label field 245 represents the OSI network and transport layer characteristics of the data packets from a single micro-flow. In one embodiment, the characteristics include the protocol type, the source address, the destination address, the source port, and the destination port associated with each data packet. It should be noted that the information used to differentiate data packets of one micro-flow from another can be based on other information types including real time protocol (RTP), MPLS or Differentiated Services (DiffServ) identifiers, or other information relating to a characteristic that is unique to the data packets of a specific micro-flow.

The QoS field 240 includes a set of QoS descriptors that describe QoS constraints of the related micro-flow. Among other, the information that can be included in the QoS field 240 is rate information for the micro-flow. Specifically, the QoS field 240 can include a guaranteed rate (GR) value 275, an available rate (AR) value 285, packet discard time limit (D) 265, delay variation (Q) 295 and a weighing factor (W) 265 for available rate traffic. Based upon these QoS descriptors, the behavior of the micro-flow can be characterized as a basic service type, such as available rate (AR) traffic, maximum rate (MR) traffic or guaranteed rate (GR) traffic. Of course, other service types may also be incorporated, as will be apparent to those skilled in the art.

Available Rate (AR) traffic is micro-flow traffic that does not have real-time requirements, resulting in loose delay and jitter characteristics. In addition, due to the connection-oriented nature of AR traffic on the transport-layer, AR traffic has relatively relaxed loss prerequisites. Most transmission control protocol (TCP) micro-flows are examples of AR traffic.

Maximum Rate (MR) traffic is micro-flow traffic that has real-time characteristics, resulting in rigid delay and jitter requirements. Further, MR traffic is sensitive to traffic loss. An example of MR traffic is user datagram protcol (UDP) micro-flows, particularly when carrying voice or video (e.g., Real-Time Protocol (RTP)). MR traffic QoS generally is determined at the time of arrival at the switch. MR traffic may represent real-time intensive traffic wherein the source and destination are unknown, such that it cannot be pre-configured ahead of time. Thus, to determine the QoS service type for MR traffic, the arrival time of the MR traffic is monitored at the ingress portion of the switch. Thereafter, a determination is made based on the arrival time of the MR traffic as to what the QoS service type should be for a particular micro-flow.

Guaranteed Rate (GR) traffic is similar to MR traffic in its characteristics, and has strict requirements on delay, jitter, and loss. However, GR traffic has the desired rate communicated to the micro-flow LSP network by the user. This communication can be done by either explicit signaling or by user-defined traffic profiles. Thus, the guaranteed rate is well specified.

The weighing factor (W) value 245 is associated with AR traffic and indicates the share of the bandwidth available for AR traffic that can be delegated to the particular micro-flow as compared to other AR traffic micro-flows. The W value 245 typically is dynamically set according to pre-existing resource allocation on the switch. The W value 245, therefore, can permit the network to offer faster service for micro-flows associated with users who are willing to pay more for increased bandwidth. In addition, for AR traffic, the W value 245 can be dynamically set. For MR and GR traffic, the W value 245 typically is set to zero.

Figure 2C:
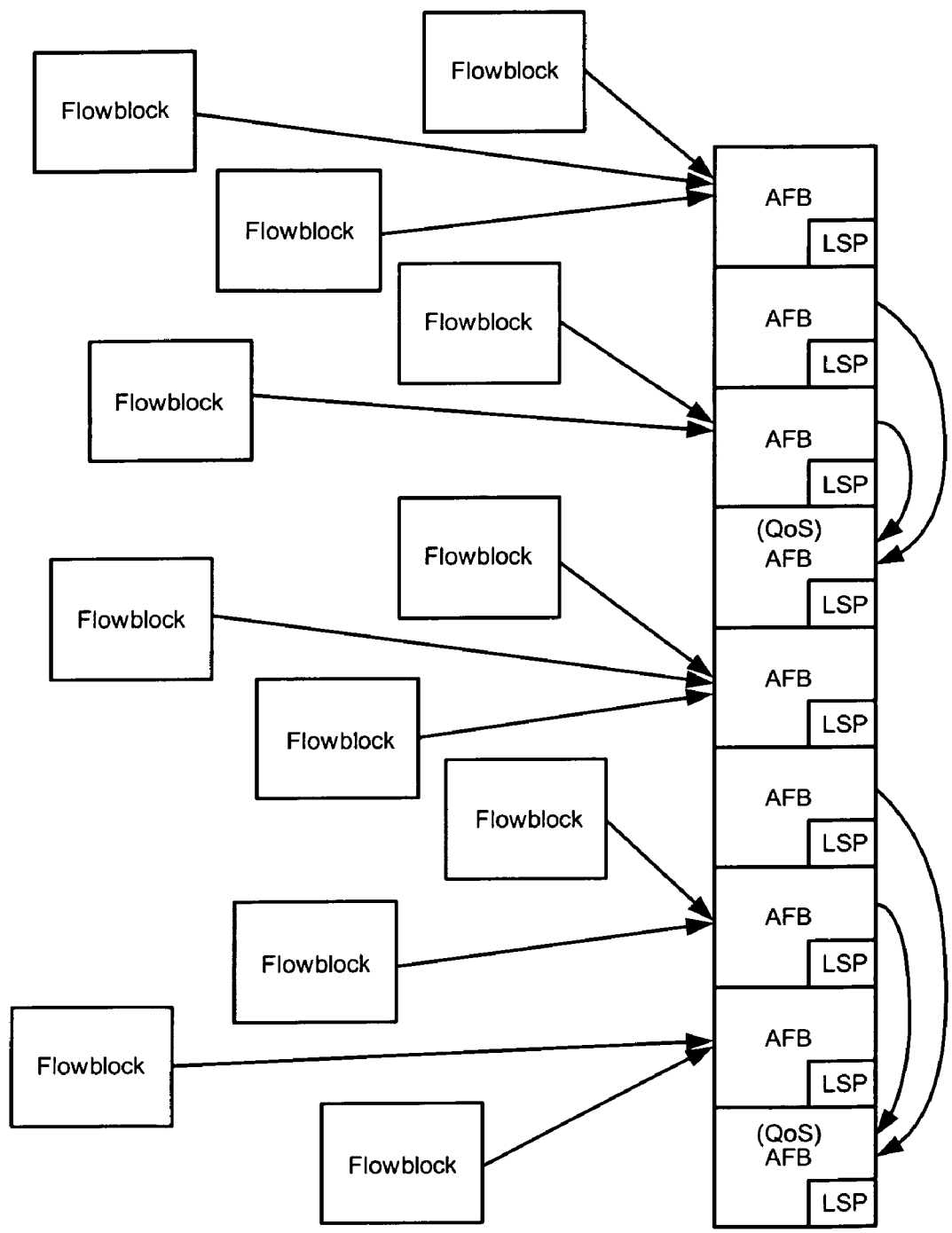

FIG. 2C is a high level block diagram illustrating the association of a flow block of a micro-flow with an aggregate flow block of an aggregate flow (e.g., LSP). An aggregate identifier field allows notions, such as guaranteed rate ("GR"), maximum rate ("MR") and available rate ("AR") micro-flows as well as load balancing of traffic within a switch fabric by selecting paths for micro-flows based on the fabric utilization (e.g., resource management feedback); load balancing of traffic on multi-link external ports based on port utilization (e.g., again through resource management feedback); and policing, shaping and scheduling micro-flows within a tunnel, to be associated with an aggregate flow (e.g., LSP). In a preferred embodiment, the aggregate identifier is in the flow block. In this manner, the flow block will the location of the aggregate flow block (AFB).

FIG. 1A is an illustration of an exemplary segment of a micro-flow LSP network domain 100 and specifically an ingress linecard of label switched router (LSR), in accordance with an embodiment of the present invention. The micro-flow LSP domain 100 includes ingress LSR 102, transit LSRs 106a–106c, penultimate LSRs 108a–108c, and an egress LSR 110. In addition, the micro-flow LSP domain 100 includes three LSPs, LSP #1 112, LSP #2 114, and LSP #3 116. The micro-flow LSP network domain 100 optionally may be coupled to conventional network routers 104 via the ingress LSR 102 and the egress LSR 110.

The ingress LSR 102 is the LSR that encapsulates the data in micro-flow header. The transit LSRs 106a–106c are intermediate LSRs along an LSP. The data plane action taken is that of label swapping, which is translating the incoming label to an outgoing label and outgoing interface. Each penultimate LSR 108a–108c is the second-to-last LSR of an LSP. For example, penultimate LSR 108a is the second-to-last LSR in LSP#1 112. In one embodiment, if requested to do so by the egress LSR 110, the penultimate LSRs 108a–108c strip off the MPLS header of the data packet of a micro-flow and forward the packets to an egress interface based on the MPLS header. This saves the egress LSR 110 the work of having to both strip off the MPLS header and then route the data packets via the encapsulated data. In addition, bandwidth is saved since the MPLS header is not forwarded.

In operation, flow data arriving at the ingress LSR 102, typically from a host or a conventional network, is forwarded through the micro-flow LSP network domain 100 using an LSP, such as LSP #1 112, LSP #2 114, and/or LSP #3 116. More specifically, flow data arriving at the ingress LSR 102 is converted into a micro-flow. Then, an ingress linecard in the ingress LSR 102 selects a LSP based on the utilization values of the LSPs and QoS requirements of the micro-flow, such as delay, loss, number of hops, packet burst size and jitter, as explained in greater detail subsequently. To be precise, the selection of an LSP is really based on the Forwarding Equivalence Class ("FEC") table. If there are multiple LSPs defined for an FEC, then one can select the LSPs (the FEC maps flows to multiple LSPs) based on utilization. If there are multiple output ports for an LSP (a multi-link trunk), then the output port for that LSP is selected based on utilization so that traffic can be load balanced over those ports. The micro-flow then is forwarded through the micro-flow LSP network domain 100 using the selected LSP.

In one embodiment, a multi-link interface 118 may be used to connect two LSRs along an LSP. A multi-link interface 118 provides multiple physical links between two LSRs. In FIG. 1A, LSP #2 114 includes a multi-link interface 118 between transit LSR 106b and penultimate LSR 108b. When a LSR of an embodiment of the present invention is connected to another LSR via a multi-link interface 118, the LSR load balances micro-flows across the multi-link interface 118. In particular, the LSR examines the utilization value of each link in the multi-link interface 118 and transmits the micro-flow along the link having the lowest utilization value.

Figure 1B:
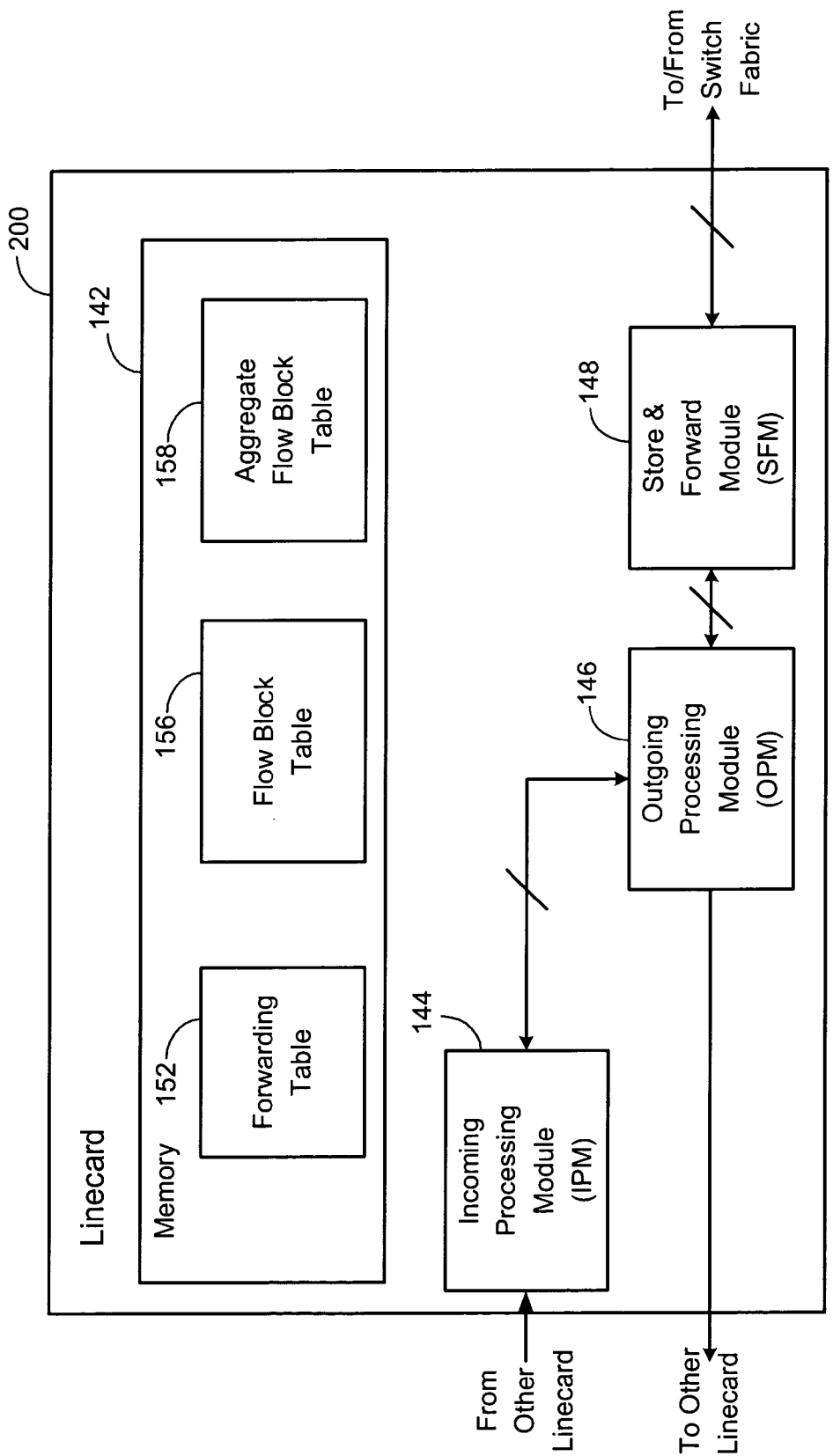
FIG. 1B is a high level block diagram illustrating a linecard within an LSR in accordance with an embodiment of the present invention.

FIG. 1B is a high level block diagram illustrating a linecard 140 within an LSR 102 in accordance with an embodiment of the present invention. The linecard 140 includes an incoming processing module (IPM) 144, an outgoing processing module (OPM) 146, a memory 142, and a store and forward module (SFM) 148. In one embodiment, the IPM 144 serves as the interface for incoming communications from the other routers of the network 100 or from another linecard 140. When a set of information such as an IP packet is received, the IPM 144 prepares the packet for routing to another linecard on LSR 102. When processing an incoming packet, the linecard 140 shown in FIG. 1B acts as the ingress linecard 200a, and the linecard to which the packet is to be routed acts as the egress linecard 200c. In preparing the packet for routing, the IPM 144 determines the proper egress linecard for the packet. In one embodiment, the IPM 144 carries out this function by extracting a destination IP address from the packet and consulting the forwarding table 152 in the memory 142 to determine the proper egress linecard for the given destination IP address. As an alternative, the egress linecard 200c may be ascertained by consulting one of the flow blocks from the flow block table 156. After the egress linecard is determined, the IPM 144 forwards the packet to the OPM 146 for routing to the egress linecard 200c.

By the time the OPM 144 receives the incoming packet, all that has been determined is the egress linecard 200c to which the packet is to be routed. The actual route that is to be taken through the switching fabric 201 to get to the egress linecard 200c has not been ascertained. Thus, one of the functions of the OPM 146 is to determine a proper route through the switching fabric 201. In one embodiment, the OPM 146 determines a proper route to the egress linecard 200c. After a route to the egress linecard 200c is determined, the OPM 146 appends the route to the packet, and sends the packet to the SFM 148 for routing through the switching fabric 201. With the route thus specified in the packet, the SFM 148 and the switching fabric 201 will, barring a failure, convey the packet to the proper egress linecard 200c.

In addition to routing incoming packets to an egress linecard, the OPM 146 also may act as an interface for sending outgoing packets to another router. For example, if the linecard 200c in FIG. 2A is selected as the egress linecard 200c for a particular packet, then the OPM 146 receives an outgoing packet, through the switching fabric 201 and the SFM 148, from another linecard. In response, the OPM 146 processes the outgoing packet, and forwards it to the router to which the OPM 146 is coupled. The outgoing packet is thus routed through the egress linecard 200c to the other router.

To send information to, and to receive information from the switching fabric 201, the OPM 146 goes through the SFM 148. In effect, the SFM 148 acts as the interface between the linecard 200c and the switching fabric 201 of the router 102. In one embodiment, the OPM 146 has multiple links to the SFM 148, and the SFM 148 in turn has multiple links to the switching fabric 201. These multiple links, which in one embodiment are bi-directional, provide great flexibility in conveying information from one linecard to another.

For purposes of the present invention, the SFM 148 may take on many different forms. In one embodiment, the SFM 148 takes on the form of a multi-port switch comprising a plurality of bi-directional ports. A plurality of the ports are coupled to the OPM 146, while the remainder of the ports are coupled to the switching fabric 201. In such a switch, each port may act as an input port or an output port, and each port may be selectively coupled (i.e. switched) to any port. With such a switch, information may enter at any port, get switched, and exit at any port. There are many possible implementations for this type of switch.

In determining the proper routing of a packet through the router 102, the IPM 144 and the OPM 146 consult and rely upon information stored in the memory 142. In one embodiment, this information includes forwarding table 152, flow block table 156 and aggregate flow block table 158. The forwarding table 152 includes three columns: a destination IP address column, a primary egress linecard column, and an alternate egress linecard column. Each entry in destination IP address column stores a particular IP address, each entry in column a primary egress linecard column stores an identifier of a particular linecard 200c in the router 102, and each entry in the alternative egress linecard column likewise stores an identifier of a particular linecard 200c in the router 102. Basically, the forwarding table 152 specifies, for each IP address, two linecards that may be used as the egress linecard for forwarding information to that IP address. Using this information, the IPM 144 can quickly and easily determine, given an incoming packet and a destination IP address, which linecard 200c of the router 102 may be used as the egress linecard for that packet. As noted previously, the information stored in the forwarding table 152 is pre-calculated and provided by an application processor. Thus, when determining an egress linecard for a packet, the IPM 144 need not perform any complex or time consuming routing calculations. Instead, it carries out a simple table lookup operation. By simplifying the egress linecard determination process, the routing process is made much faster and more efficient. In one embodiment, the information contained in the forwarding table 152 applies to all of the linecards in the router 102. Thus, the same table 152 may be stored in all of the linecards of the router 102.

FIG. 2A is a high level block diagram illustrating several linecards within an LSR 102 of an embodiment of the present invention. The ingress LSR 102 includes ingress linecards 200a and 200b, each including an IPM 144, an OPM 146, a SFM 148 and a memory 142 as discussed in FIG. 1B. The ingress LSR 102 further includes an egress linecard 200c including an IPM 144, an OPM 146, a SFM 148 and a memory 142 as discussed in FIG. 1B. Although one egress linecard 200c and two ingress linecards 200a and 200b are shown in FIG. 2A, it should be noted that multiple egress linecards 200c and multiple ingress linecards 200 may be included in an ingress LSR 102 of the embodiments of the present invention.

In operation, the ingress linecards 200a and 200b receive IP data packets and utilize a forwarding information base (FIB) 214 in conjunction with ingress flow blocks 210 from flow block table 156 to forward created micro-flows to the appropriate egress linecard 200c, as discussed in greater detail subsequently. In one embodiment, the FIB 214 is passed to the linecard and the forwarding tables 152 are populated with information from the FIB 214. The egress linecard 200c utilizes aggregate flow blocks (AFBs) 216 from the aggregate flow block table 158 in conjunction with egress flow blocks 212 to forward the micro-flows to the appropriate LSP. As will be explained in greater detail subsequently, each LSP may comprise multiple physical connections. As such the ingress linecards 200a and 200b of the embodiments of the present invention also determine which physical connection of a LSP to use for a particular micro-flow.

Figure 3:
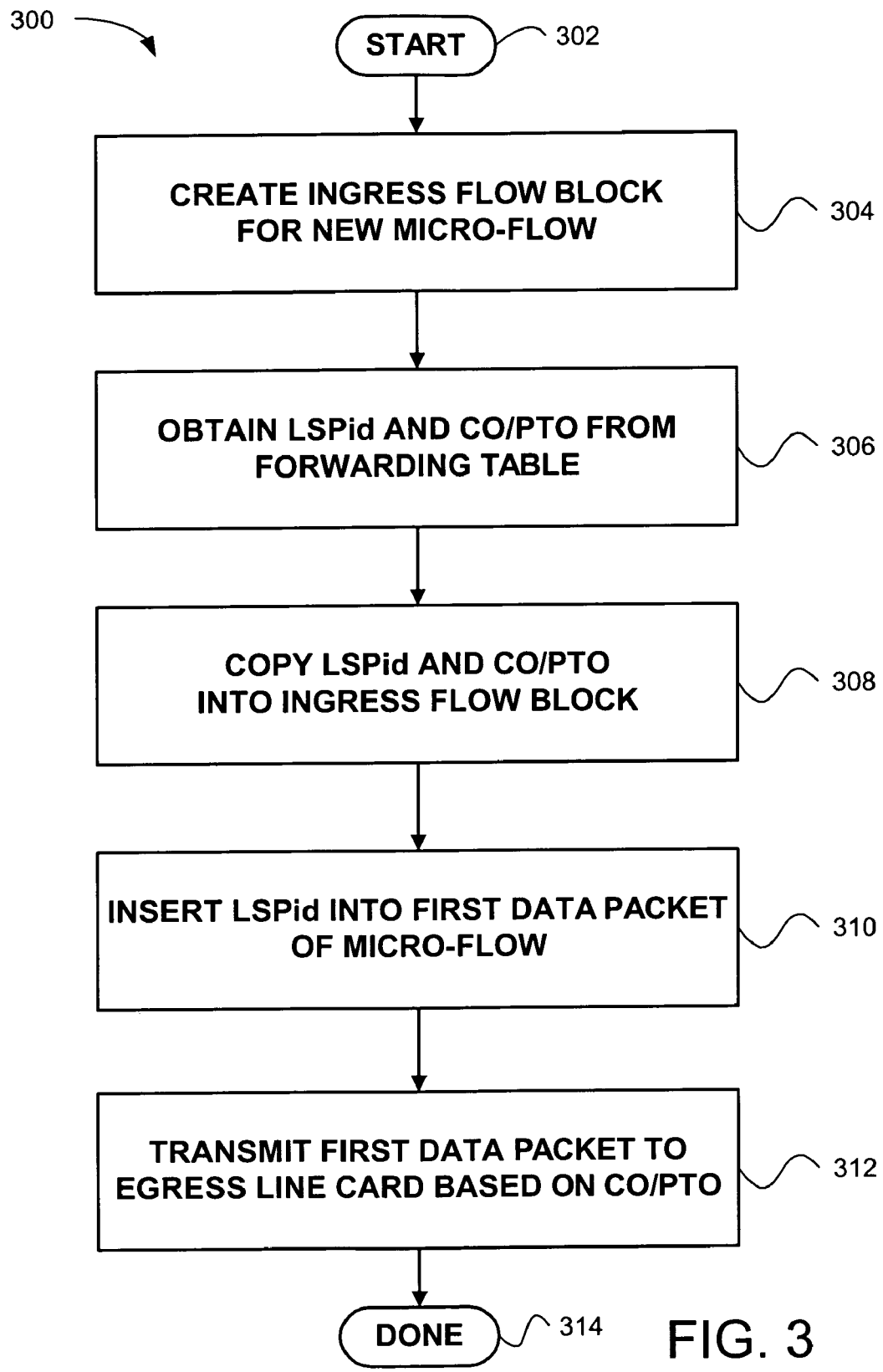
FIG. 3 is a high level flow diagram illustrating a method for label processing at an ingress linecard in an ingress LSR for the first data packet of a micro-flow, in accordance with an embodiment of the present invention.

FIG. 3 is a high level flow diagram showing a method 300 for label processing at the ingress linecard 200 in the ingress LSR 102 for the first data packet of a micro-flow, in accordance with an embodiment of the present invention. In an initial operation, preprocess operations are performed. Preprocess operations typically include receiving the first data packet of a micro-flow, determining an appropriate QoS 240 and a label 245 for the received micro-flow, and other preprocess operations that are described in more detail in U.S. patent application Ser. No. 09/552,278, filed on Apr. 19, 2000, entitled "MICRO-FLOW MANAGEMENT," which is hereby incorporated by reference in its entirety.

In the flow block creation operation 304, an ingress linecard 200 either identifies an already generated flow block 210 or creates a new flow block 210 for a received data packet. In one embodiment of the present invention, the IPM 144 hashes the received data packet and determines or identifies, based upon such information as the destination address, source address, destination port, source port, and protocol type, a unique label identifier 245 and QOS 240 information for the micro-flow. The label identifier 245 and QOS identifier 245 is stored within a flow block 210, which will reflect unique flow state information for the identified micro-flow and is stored in the flow block table 156. The flow block 210 can include QoS 210 information including an aggregate flow (e.g., LSP) identifier, rate information, the specific egress linecard and port to be used by the micro-flow, and the protocol to be used by the micro-flow.

In a lookup operation 306, the LSP, egress linecard, and egress port are obtained from the forwarding table 152. To forward the micro-flow through the fabric of the LSR, embodiments of the present invention use the destination address of the micro-flow to determine where to send the data packets. Referring to FIG. 2A, the destination address of the micro-flow is used to index into the forwarding information base 214 to obtain a LSP identifier ("LSPid") and a egress linecard path ("CO")/a port path ("PTO") for the micro-flow. The CO is therefore the card out, and the PTO is the port out. The LSPid can also be defined as a connection ID (CID).

The LSPid is used by the embodiments of the present invention to identify a particular LSP to use when transmitting the micro-flow through the network domain. Since an LSP is a logical construct that may actually comprise multiple physical connections, the forwarding information base 214 also provides specific link information. More specifically, the forwarding information base 214 provides the specific egress linecard 200*c* where the micro-flow should be sent. This egress linecard obtained from the forwarding information base 214 will be referred to as the egress linecard destination ("CO"). The forwarding information base 214 further provides the specific output port on the egress linecard 200*c* to use when forwarding the micro-flow. The specific output port on the egress linecard obtained from the forwarding information base 214 will be referred to as egress port address ("PTO").

The LSPid and CO/PTO obtained from the forwarding information base 214 are then copied 308 into the ingress flow block 210 associated with the micro-flow for future use with subsequent packets of the micro-flow.

The LSPid is inserted 310 into the first data packet of the micro-flow. The LSPid is also inserted into each data packet (after the first) on the ingress line card in the space normally taken up by the Label (245). Once it has gone across the backplane, the LSPid is taken and a lookup is performed into the egress cards' AFB table. The egress AFB contains more information about the flow, such as whether to push, pop or swap a label, also, which label to swap or push. This AFB is then referred to by the egress-side flow block (the hash value was passed over as well to save work for the egress card). The label to swap is then taken and written over the LSPid which previously over-wrote the incoming label (245). So, we over-ride field 245 with the LSPid within the box and write the outgoing label into the same space before it leaves the box. For subsequent packets of the flow, the LSPid is written over the label on all packets because the ingress card, in one embodiment, does not know when the egress card will timeout the micro-flow block. When it does timeout, then the AFB lookup can be performed. Therefore, it needs to have an LSPid whenever that timeout occurs.

As illustrated in FIG. 2C, the LSPid is used to identify an LSP to use to transmit the micro-flow across the network domain. Also illustrated is the relationship between micro-flow blocks and aggregate flow blocks (AFBs), as well as the relationship between AFB's. Additional description of these relationships is provided with reference to FIG. 11 below.

In a transmitting operation 312, the first data packet of the micro-flow is transmitted across the fabric of the ingress LSR 102 to an egress linecard 200*c* based on the CO/PTO. As mentioned above, the CO determines to which egress linecard 200*c* the packet should be sent, and the PTO identifies which port on the egress linecard 200*c* to use for sending the packet to the next hop along the network domain. In instances where the selected LSP comprises multiple physical connections, the ingress linecards 200*a* and 200*b* determine which physical connection to use and transmit this information in the form of a CO/PTO.

For instance, in a trunk situation (e.g., an LSP spans multiple physical ports/cards) the ingress line card has logic which rotates the CO/PTO. A flow block will always contain the same CO/PTO (unless it times-out, in which case the CO/PTO could change), but other flows going to the same LSP may contain different CO/PTOs. That way we can balance the load of an LSP across the fabric as well as customers network connections.

One embodiment of the present invention uses link utilization to determine which physical link to use when transmitting a micro-flow. Specifically, the ingress linecard 200 performs load balancing by choosing the least utilized link to transmit the micro-flow. Other embodiments may use time slicing to determine which physical link to use when transmitting the micro-flow. In this embodiment, all micro-flows destined for a particular LSP are transmitted over a first physical link during a first period of time. Then all micro-flows destined for the particular LSP are transmitted over a second physical link during a second period of time. The ingress linecard 200*a* then continues to change physical links for the LSP over time, thereby load balancing the LSP.

Post process operations are performed in operation 314. Post process operations include determining the outgoing label for the micro-flow, transmitting the micro-flow across the network domain, and other post process operations that will be apparent to those skilled in the art.

Figure 4:
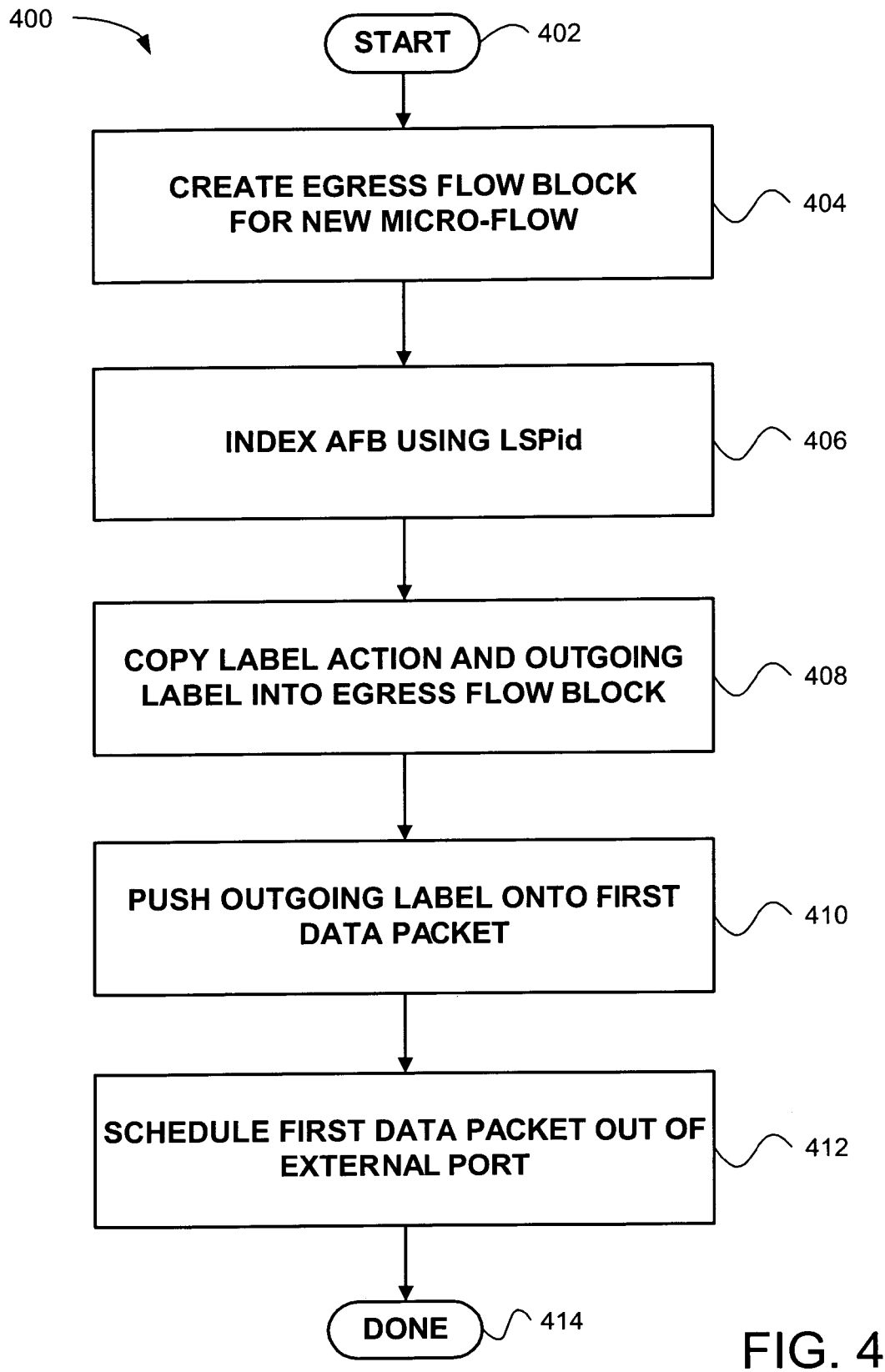
FIG. 4 is a high level flow diagram illustrating a method for label processing at an egress linecard in an ingress LSR for the first data packet of a micro-flow, in accordance with an embodiment of the present invention.

FIG. 4 is a high level flow diagram illustrating a method 400 for label processing at the egress linecard 200*c* in the ingress LSR 102 for the first data packet of a micro-flow, in accordance with an embodiment of the present invention. In an initial operation 402, preprocess operations are performed. Preprocess operations can include receiving the first data packet of a flow, determining the LSPid for the micro-flow, and other preprocess operations that will be apparent to those skilled in the art.

In a flow block creation operation 404, an egress flow block is created for the new micro-flow. As previously mentioned, the present invention maintains flow state information on each micro-flow processed by the system. As illustrated in FIG. 2A, the egress flow block 212 is used to store flow state information for a particular micro-flow, including which LSP the micro-flow is using, the outgoing label, and the label action for the micro-flow. One embodiment of the present invention hashes on the destination address, source address, destination port, source port, and protocol type to provide a unique identifier for the micro-flow, and associate the micro-flow with the created egress flow block.

An aggregate flow block is then indexed using the LSPid, in an indexing operation 406. Referring to FIG. 2A, the LSPid associated with the micro-flow is used to find the AFB 216 corresponding to the LSP selected by the LSPid. During creation of the network domain, each LSP is assigned an AFB 216. The AFBs 216 are used to manage the millions of flow blocks that are created in the operation of the network domain. Each AFB 216 includes information pertaining to an associated LSP. Each flow block then points to the AFB 216 associated with the LSP being used to route the related micro-flow, as described with reference to operation 408.

Referring back to FIG. 4, the label action and outgoing label are copied into the egress flow block, in a copy operation 408. As mentioned above, each LSP connected to the egress linecard has an AFB associated with the LSP. The AFB includes information specific to the associated LSP used in forwarding data packets across the network domain. This information includes the outgoing label for the LSP and the label action for the LSP. As will be described in greater detail subsequently, each AFB further includes statistics for the associated LSP, such as the number of packets forwarded and the errors that occurred in the LSP. The AFB thus allows most of the information for a particular LSP to be stored together and accessed by all micro-flows that require access to the information.

The outgoing label then is pushed onto the first data packet of the micro-flow, in a push operation 410. Operation 410 actually carries out the label action obtained in operation 408. Label actions can include pushing the label, which results in the outgoing label being added to the data packet, swapping the label, which results in the outgoing label being replaced with a new outgoing label, and popping the label, which results in the outgoing label being removed. As is know in MPLS, "popping" refers to the act of removing the MPLS label information. Since operation 410 is concerned with the first data packet of a micro-flow, the label action generally will be to push the outgoing label onto the first micro-flow data packet. As previously mentioned, the outgoing label in an MPLS network domain is used to route the micro-flow to a specific LSR in the network domain, thus pinning the path of the micro-flow and allowing for faster routing of the micro-flow through the network domain.

The first data packet then is scheduled out of the external port, in operation 412. Referring to FIG. 1A, the first data packet is transmitted to the next LSR along the LSP at a time determined by the SFM 148 on the egress linecard 200c. The SFM 148 facilitates policing and shaping of the LSP according to the LSP parameters stored in the AFB 216. Additional information on policing and shaping an LSP can be found in related U.S. patent application Ser. No. 09/699,199, filed Oct. 27, 2000, entitled "SYSTEM AND METHOD FOR UTILIZATION BASED MICRO-FLOW LABEL SWITCHING," which is hereby incorporated by reference in its entirety.

Post process operations are then performed in operation 414. Post process operations include processing subsequent data packets of the micro-flow, transmitting LSP utilization information to the ingress linecards, and other post process operations that will be apparent to those skilled in the art. Advantageously, the AFBs of the embodiments of present invention provide the ability to combine micro-flow flow state information with LSP utilization, allowing LSP statistics collection, LSP alteration, and LSP teardown without introducing prohibitively time consuming and processor intensive tasks to the network system.

Without the use of an LSP AFB, collecting statistical information for the related LSP while maintaining flow state information could be prohibitively time consuming and processor intensive. The AFB avoids the need to search millions of flow blocks to identify flow blocks pertaining to the particular LSP and sum the total bytes, packets, and errors stored in the individual flow blocks pertaining the LSP. By using an AFB of the embodiments of the present invention, a running tally of bytes, packets, and errors can maintained in the AFB at all times.

In addition, altering an LSP while maintaining flow state information could be prohibitively time consuming and processor intensive without the use of an AFB of an embodiment of the present invention. The AFB avoids the need to search millions of flow blocks to find flow blocks using the particular LSP, and then altering each flow block to correspond with the LSP alteration. Using the AFB of the embodiments of the present invention, the AFB can be altered to correspond to the LSP alteration, and the AFB change can be picked up automatically when the AFB is accessed for future flow blocks.

Similarly, tearing down an LSP while maintaining flow state information could be prohibitively time consuming and processor intensive without the use of an AFB of the present invention. The AFB avoids the need to search millions of flow blocks to find flow blocks using the particular LSP, and then closing each flow block found. Using the AFB of the embodiments of the present invention, the field in the AFB can be set to indicate that the LSP has been torn down and alternate action should be taken for any flow accessing the AFB.

Figure 5:
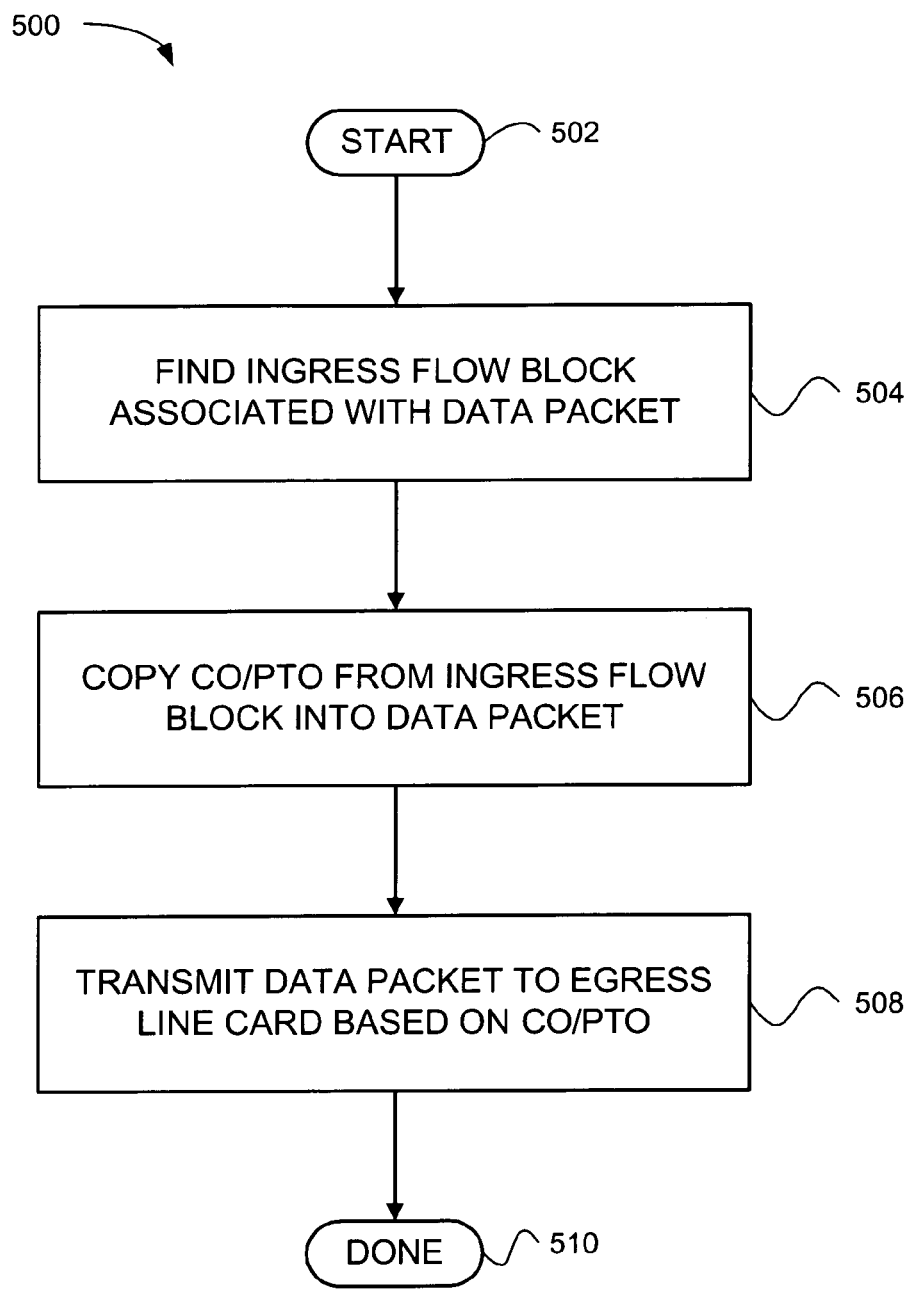
FIG. 5 is a high level flow diagram illustrating a method for label processing at an ingress linecard in an ingress LSR for subsequent data packets of a micro-flow, in accordance with an embodiment of the present invention.

FIG. 5 is a high level flow diagram illustrating a method 500 for label processing at the ingress linecard 200a in the ingress LSR 102 for subsequent data packets of a micro-flow, in accordance with an embodiment of the present invention. Preprocess operations are performed in a preprocess operation 502. Preprocess operations include creating an ingress flow block for the micro-flow, creating an egress flow block for the micro-flow, and other preprocess operations that will be apparent to those skilled in the art.

In a find operation 504, the ingress flow block associated with the received data packet is found. Since the ingress flow block for the micro-flow was created when the first data packet for the micro-flow was processed, the ingress flow block generally does not need to be recreated, as shown in FIG. 6.

Figure 6:
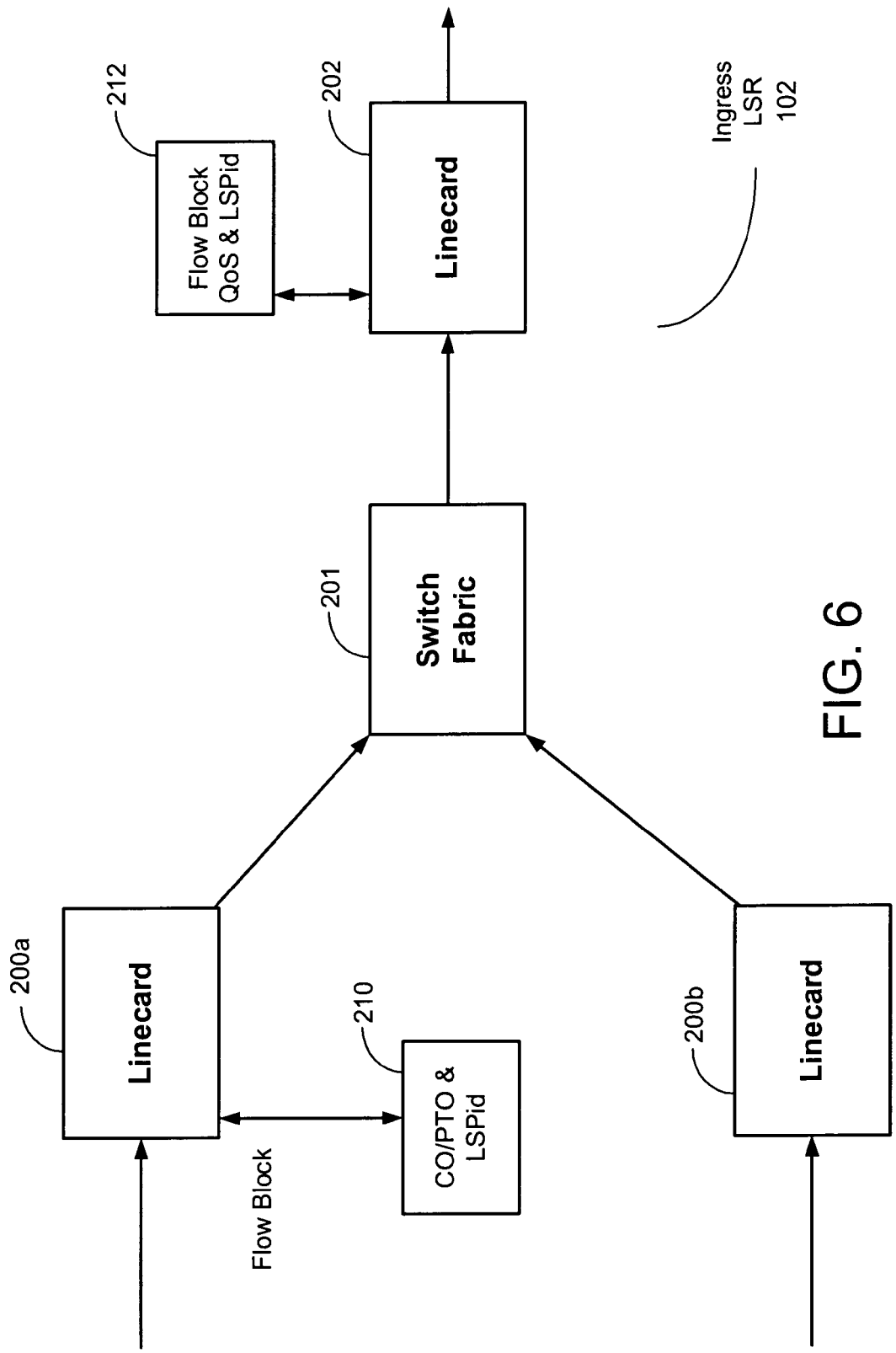
FIG. 6 is a high level block diagram illustrating an ingress LSR after the first data packet for the micro-flow has been processed, in accordance with an embodiment of the present invention.

FIG. 6 is a high level block diagram illustrating an ingress LSR 102 after the first data packet for the micro-flow has been processed, in accordance with an embodiment of the present invention. The ingress LSR 102 includes ingress linecards 200a and 200b, each having an IPM 144, an OPM 146, and a SFM 148. The ingress LSR 102 further includes an egress linecard 200c having an IPM 144, an OPM 146, and a SFM 148. Although one egress linecard 200c and two ingress linecards 200a and 200b are shown, it should be noted that multiple egress linecards 200c and multiple ingress linecards 200a/200b may be included in an ingress LSR 102 of the embodiments of the present invention. FIG. 6 shows the flow block 210 after the first data packet for the micro-flow has been processed. The flow block 210 includes the CO, PTO, and LSPid for the micro-flow. Also included in the ingress flow block 210 is the protocol type of the micro-flow and other flow state information for the micro-flow.

Referring back to FIG. 5, the CO and PTO located in the ingress flow block 210 are copied into the data packet, in a copy operation 506. As previously mentioned, the CO of the micro-flow determines which egress linecard will receive the data packet, and the PTO determines which port of the egress linecard will be used to transmit the data packet. This information then is used by the SFM 148 of the ingress linecards 200a/200b to transmit the data packet to the appropriate egress linecard 200c.

The data packet then is transmitted to the egress linecard 200c based on the CO/PTO, in a transmission operation 508. As mentioned above, the CO determines to which egress linecard 200c the packet should be sent, and the PTO identifies which port on the egress linecard 200c to use for sending the packet to the next hop along the network domain. In instances where the selected LSP comprises multiple physical connections, the ingress linecards 200a and 200b determine which physical connection to use and transmit this information in the form of a CO/PTO.

Post process operations are performed in operation 510. Post process operations include obtaining the outgoing label for the data packet, transmitting the data packet across the network domain, and other post process operations that will be apparent to those skilled in the art.

Figure 7:
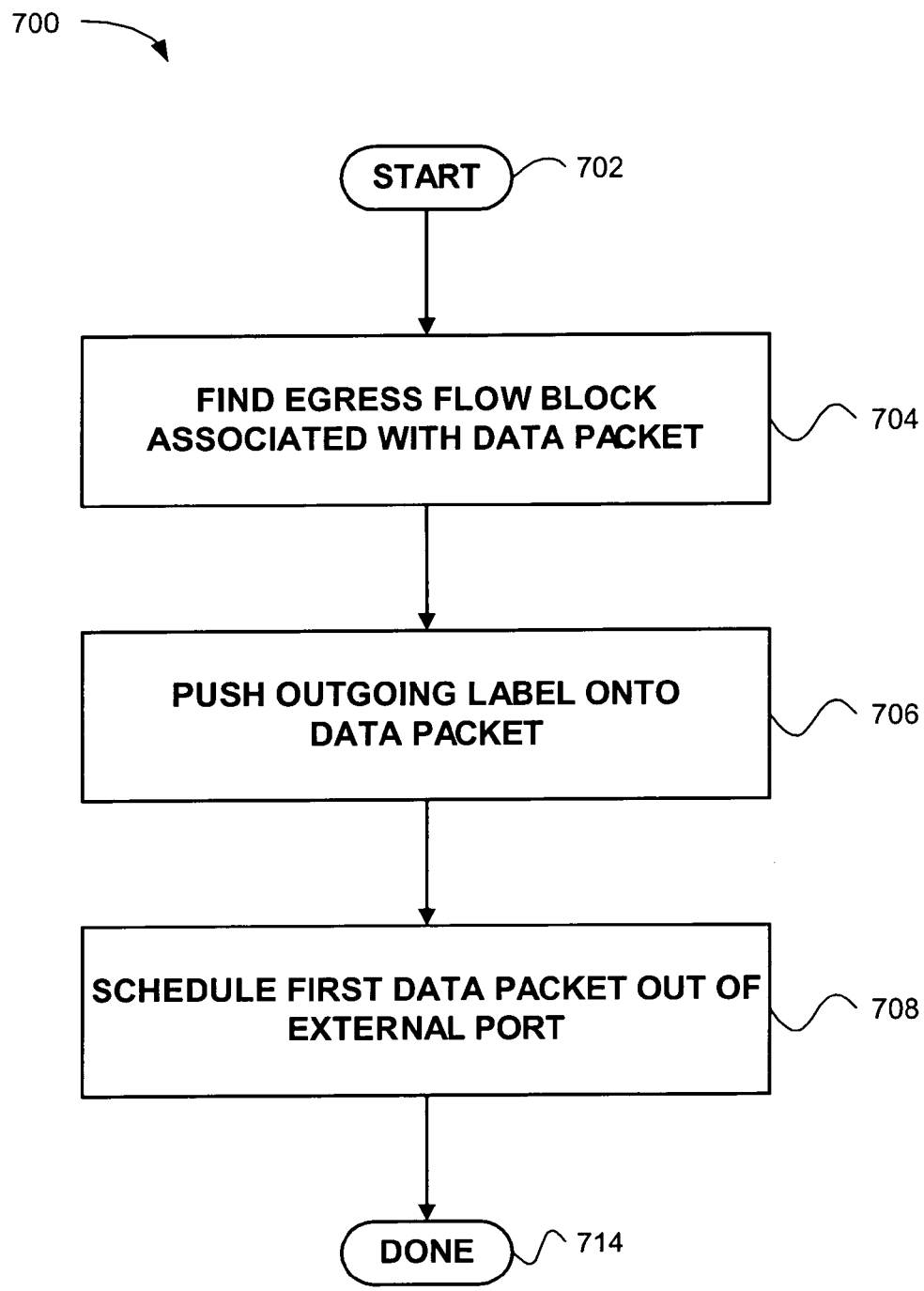
FIG. 7 is a high level flow diagram illustrating a method for label processing at an egress linecard in an ingress LSR for subsequent data packets of a micro-flow, in accordance with an embodiment of the present invention.

FIG. 7 is a high level flow diagram illustrating a method 700 for label processing at the egress linecard 200c in the ingress LSR 102 for subsequent data packets of a micro-flow, in accordance with an embodiment of the present invention. In an initial operation 702, preprocess operations are performed. Preprocess operations include receiving the data packet, determining which egress linecard will receive the data packet, and other preprocess operations that will be apparent to those skilled in the art.

In a find operation 704, the egress flow block 212 associated with the received data packet is found. Since the egress flow block for the micro-flow was created when the first data packet for the micro-flow was processed, the egress flow block generally does not need to be recreated, as shown in FIG. 6. Referring to FIG. 6, the egress flow block 212 stores flow state information for a particular micro-flow after the first data packet for the micro-flow has been processed, including which LSP the micro-flow is using, the outgoing label, and the label action for the micro-flow. One embodiment of the present invention hashes on the destination address, source address, destination port, source port, and protocol type to provide a unique identifier for the micro-flow and to associate the micro-flow with the egress flow block.

Referring back to FIG. 7, the outgoing label is pushed onto the data packet, in a push operation 706. Operation 706 actually carries out the label action stored in the egress flow block 212. As previously mentioned, label actions can include pushing the label, which results in the outgoing label being added to the data packet, swapping the label, which results in the outgoing label being replaced with a new outgoing label, and popping the label, which results in the outgoing label being removed. Since operation 706 occurs at the ingress LSR 102 of the network domain, the label action generally is to push the outgoing label onto the micro-flow data packet. As previously mentioned, the outgoing label in an MPLS network domain is used to route the micro-flow to a specific LSR in the network domain, thus pinning the path of the micro-flow and allowing for faster routing of the micro-flow through the network domain.

The data packet then is scheduled out of the external port, in operation 708. Referring to FIG. 6, the data packet is transmitted to the next LSR along the LSP at a time determined by the SFM 148 on the egress linecard 200c. The SFM 148 facilitates policing and shaping of the LSP according to the LSP parameters stored in the AFB 216.

Post process operations then are performed in operation 714, which can include processing subsequent data packets of the micro-flow, transmitting LSP utilization information to the ingress linecards and other post process operations that will be apparent to those skilled in the art.

Figure 8:
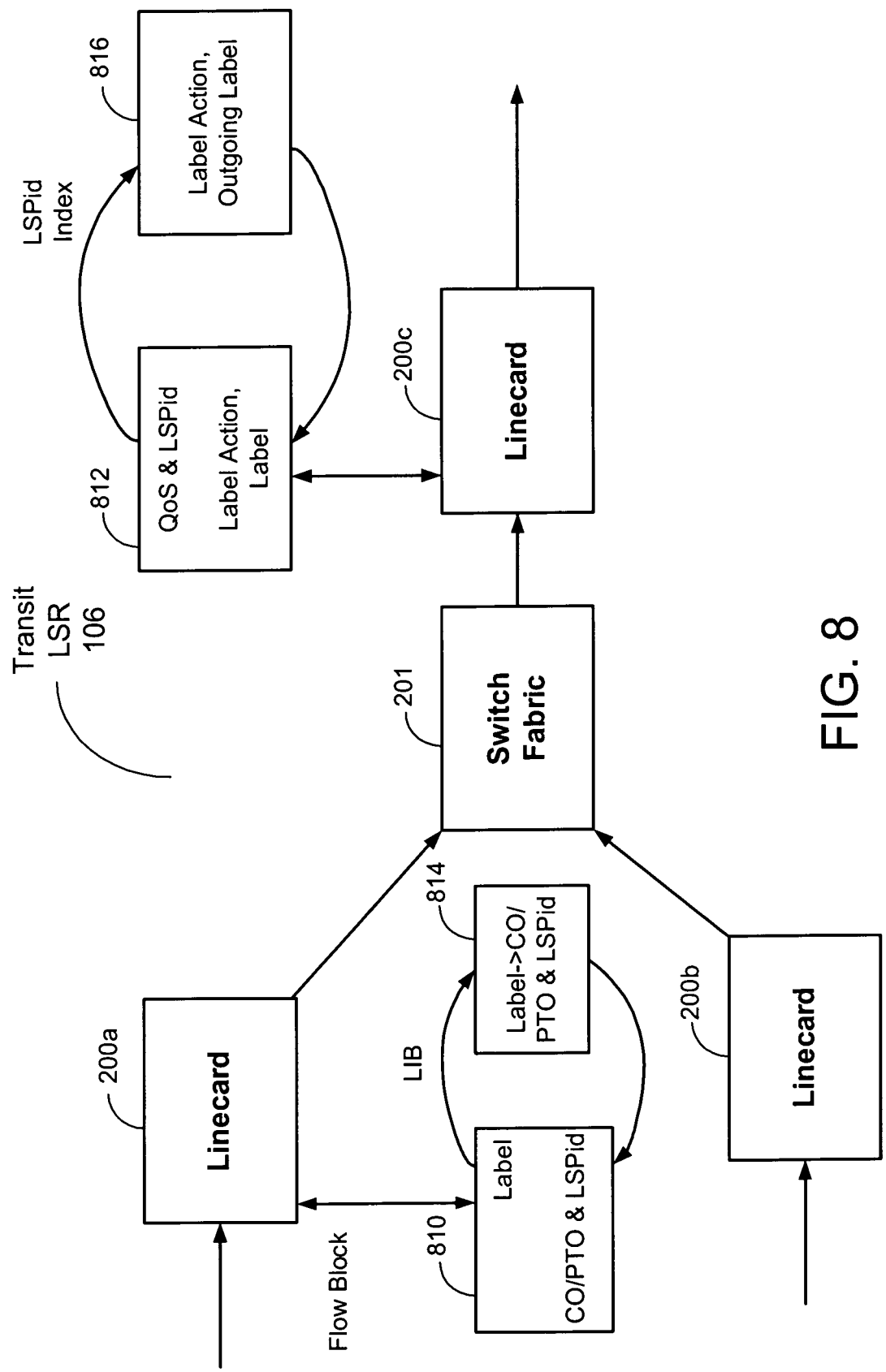
FIG. 8 is a high level block diagram illustrating a transit LSR in accordance with an embodiment of the present invention.

FIG. 8 is a high level block diagram illustrating a transit LSR 106 in accordance with an embodiment of the present invention. The transit LSR 106 includes ingress linecards 200a and 200b, each having a IPM 144, a OPM 146, and a SFM 148. The transit LSR 106 further includes an egress linecard 200c having an IPM 144, an OPM 146, and a SFM 148. Although one egress linecard 200c and two ingress linecards 200a and 200b are shown in FIG. 8, it should be noted that multiple egress linecards 200c and multiple ingress linecards 200a/200b may be included in a transit LSR 106 of the embodiments of the present invention.

In operation, the ingress linecards 200a and 200b receive micro-flow data packets and utilize a label information base 814 in conjunction with ingress flow blocks 810 to forward created micro-flows to the appropriate egress linecard 200c, as discussed in greater detail subsequently. The egress linecard 200c then utilizes AFBs 816 in conjunction with egress flow blocks 812 to forward the micro-flows to the appropriate LSP. As mentioned previously, each LSP may comprise multiple physical connections. As such the ingress linecards 200a and 200b of the embodiments of the present invention also determine which physical connection of a LSP to use for a particular micro-flow.

Figure 9:
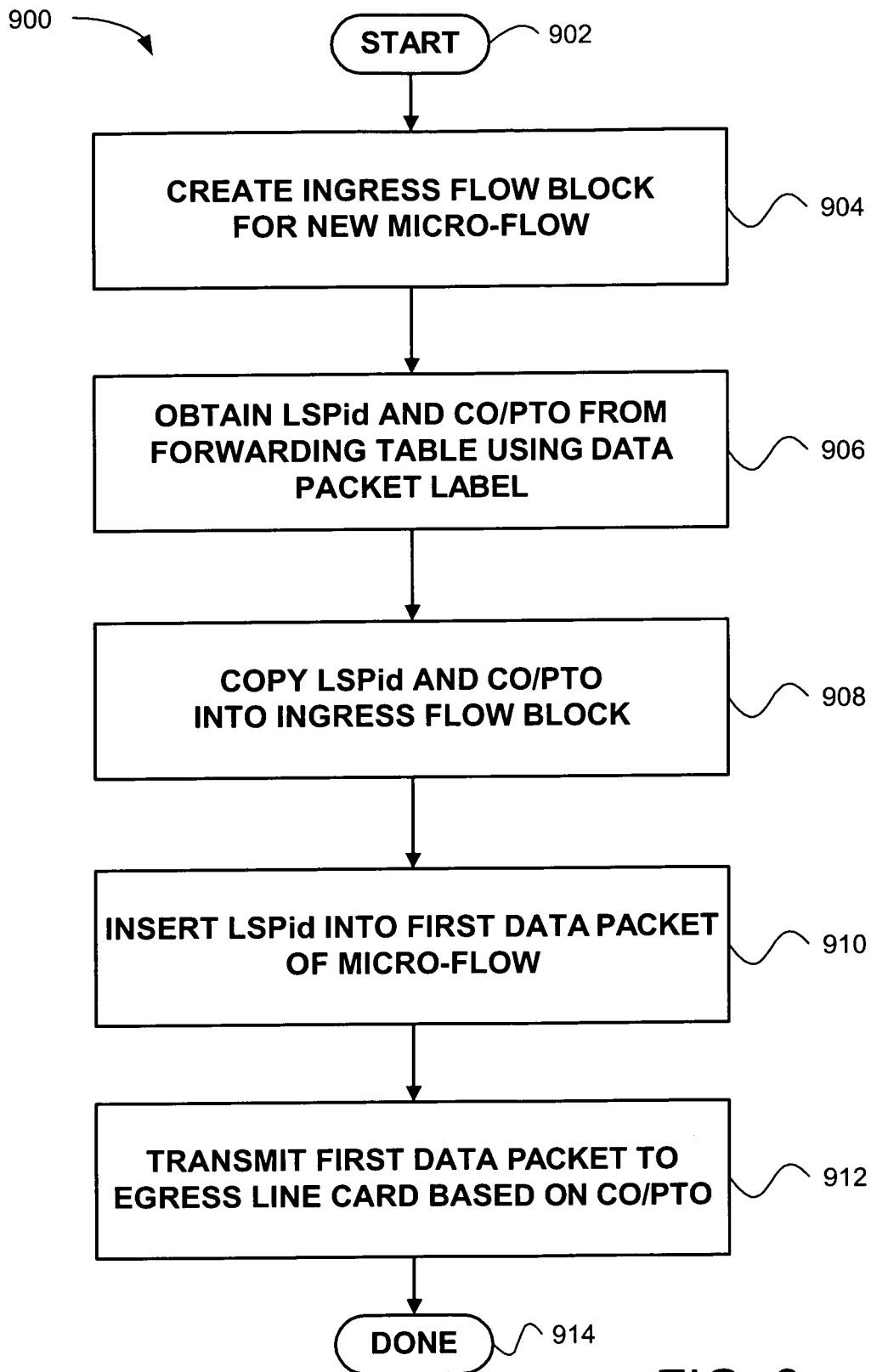
FIG. 9 is a high level flow diagram illustrating a method for label processing at an ingress linecard in a transit LSR for the first data packet of a micro-flow, in accordance with an embodiment of the present invention.

FIG. 9 is a high level flowchart illustrating a method 900 for label processing at the ingress linecard 200a/200b in the transit LSR 106 for the first data packet of a micro-flow, in accordance with an embodiment of the present invention. In an initial operation 902, preprocess operations are performed, which can include receiving the first data packet of a flow, pre-configuring LSP outgoing labels, and other preprocess operations that will be apparent to those skilled in the art.

In flow block creation operation 904, an ingress flow block is created for the new micro-flow. As previously mentioned, embodiments of the present invention maintain flow state information on each micro-flow processed by the system. Referring to FIG. 8, the ingress flow block 810 is used to store flow state information for a particular micro-flow, including the LSP being used by the micro-flow, the specific egress linecard and port used by the micro-flow, and the protocol being used by the micro-flow. One embodiment of the present invention hashes on the destination address, source address, destination port, source port, and protocol type to provide a unique identifier for the micro-flow, and associate the micro-flow with the created ingress flow block 810.

Next, in a lookup operation 906, the LSP, egress linecard, and egress port are obtained from the forwarding table. To forward the micro-flow through the fabric of the LSR, embodiments of the present invention use the incoming label of the micro-flow to determine where to send the data packets. Referring to FIG. 8, the incoming label of the micro-flow is used to index into the label information base 814 to obtain a LSPid and CO/PTO for the micro-flow.

As in the ingress LSR 102, the LSPid of the transit LSR 106 is used by the embodiments of the present invention to identify a particular LSP to use when transmitting the micro-flow through the network domain. Similar to the forwarding information base 214, the label information base 814 also provides specific link information. More specifically, the label information base 814 provides the identity of the specific egress linecard 200c where the micro-flow should be sent. The label information base 814 further provides the specific output port on the egress linecard 200c to use when forwarding the micro-flow.

Referring back to FIG. 9, the LSPid and CO/PTO obtained from the label information base 814 are copied into the ingress flow block 810 associated with the micro-flow, in a copy operation 908. Having determined a LSPid and CO/PTO to use for the micro-flow based on the incoming label of the data packet, the LSPid and CO/PTO are copied into the ingress flow block 810 associated with the micro-flow for future use with subsequent packets of the micro-flow.

The LSPid then is inserted into the first data packet of the micro-flow, in operation 910. As previously mentioned, the LSPid identifies an LSP to use to transmit the micro-flow across the network domain. As described in subsequently greater detail, the LSPid is used to find an appropriate label and label action for the micro-flow using an AFB.

Next, in a transmitting operation 912, the first data packet of the micro-flow is transmitted across the fabric of the transit LSR 106 to an egress linecard 200c based on the CO/PTO. As mentioned above, the CO identifies which egress linecard 200c should receive the data packet, and the PTO identifies which port on the egress linecard 200c to use for sending the packet to the next hop along the network domain. In instances where the selected LSP comprises multiple physical connections, the ingress linecards 200a and 200b determine which physical connection to use and transmit this information in the form of a CO/PTO.

As with the ingress LSR 102, one embodiment of the present invention uses link utilization to determine which physical link to use when transmitting a micro-flow using a transit LSR 106. Specifically, the ingress linecard 800 performs load balancing by choosing the least utilized link to transmit the micro-flow. Other embodiments use time slicing to determine which physical link to use when transmitting the micro-flow. In this embodiment, all micro-flows destined for a particular LSP are transmitted over a first physical link during a first period of time. Then all micro-flows destined for the particular LSP are transmitted over a second physical link during a second period of time. The ingress linecard 200a then continues to change physical links for the LSP over time, thereby load balancing the LSP.

Post process operations are performed in operation 914, which can include determining the outgoing label for the micro-flow, transmitting the micro-flow across the network domain, and other post process operations that will be apparent to those skilled in the art.

Figure 10:
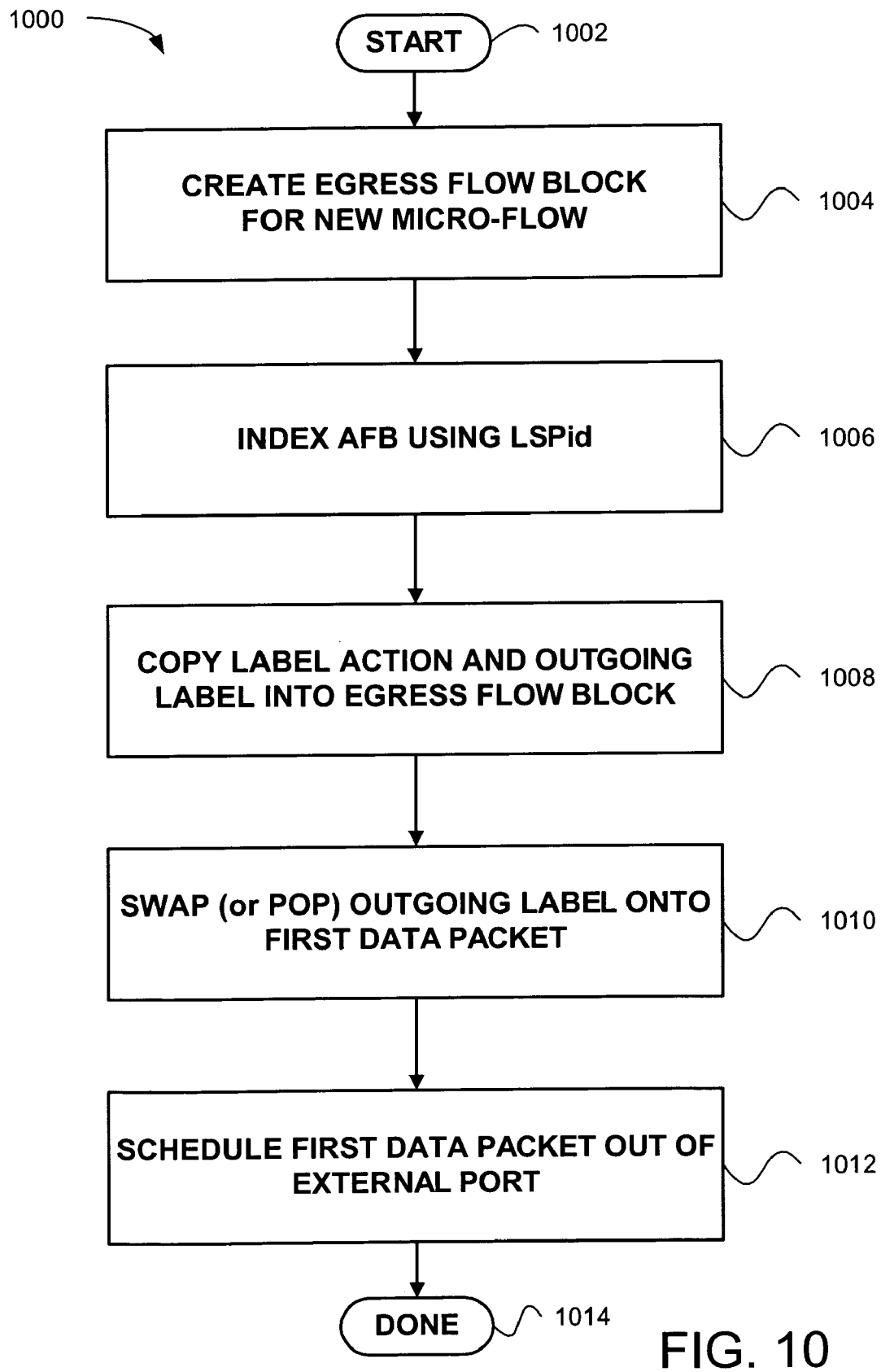
FIG. 10 is a high level flow diagram illustrating a method for label processing at an egress linecard in a transit LSR for the first data packet of a micro-flow, in accordance with an embodiment of the present invention.

FIG. 10 is a high level flowchart illustrating a method 1000 for label processing at the egress linecard 200c in the transit LSR 200c for the first data packet of a micro-flow, in accordance with an embodiment of the present invention. In an initial operation 1002, preprocess operations are performed, which can include determining an LSP for the micro-flow at the ingress LSR 102, determining the LSPid for the micro-flow for the transit LSR 106, and other preprocess operations that will be apparent to those skilled in the art.

In a flow block creation operation 1004, an egress flow block is created for the new micro-flow. As previously mentioned, the embodiments of the present invention maintain flow state information on each micro-flow processed by the system. Referring to FIG. 8, the egress flow block 812 is used to store flow state information for a particular micro-flow, including which LSP the micro-flow is using, the outgoing label, and the label action for the micro-flow.

An aggregate flow block then is indexed using the LSPid determined at the ingress linecard 200a/200b, in an indexing operation 1006. Referring to FIG. 8, the LSPid associated with the micro-flow is used to find the AFB 816 corresponding to the LSP selected by the LSPid. During creation of the network domain, each LSP that is logically connected to the transit LSR 106 is assigned an AFB 816. The AFBs 816 are used to manage the millions of flow blocks that are created in the operation of the network domain. Each AFB 816 includes information pertaining to an associated LSP. Similar to the ingress LSR 102, each flow block in the transit LSR 106 then points to the AFB 816 associated with the LSP being used to route the related micro-flow, as described with reference to operation 1008.

Referring back to FIG. 10, the label action and outgoing label are copied into the egress flow block, in a copy operation 1008. As mentioned above, each LSP connected to the egress linecard has an AFB associated with the LSP. The AFB includes information specific to the associated LSP used in forwarding data packets across the network domain. This information includes the outgoing label for the LSP and the label action for the LSP. As previously mentioned, each AFB further includes statistics for the associated LSP, such as the number of packets forwarded and the errors that occurred in the LSP. The AFB thus allows most of the information for a particular LSP to be stored together and accessed by all micro-flows that need access to the information.

The outgoing label then is swapped onto the first data packet of the micro-flow, in a swap operation 1010. Operation 1010 actually carries out the label action obtained in operation 1008. Label actions can include pushing the label, which results in the outgoing label being added to the data packet, swapping the label, which results in the outgoing label being replaced with a new outgoing label and popping the label, which results in the outgoing label being removed. Since the first data packet of a micro-flow already includes an incoming label, the label action generally will be to swap the outgoing label with the incoming label of the data packet. On penultimate LSRs 108a–108c and egress LSRs 110, the label action can be to pop the incoming label off of the data packet, thus returning the packet to its former protocol. As mentioned previously, the outgoing label in an MPLS network domain is used to route the micro-flow to a specific LSR in the network domain, thus pinning the path of the micro-flow and allowing for faster routing of the micro-flow through the network domain.

The first data packet then is scheduled out of the external port, in operation 1012. Referring to FIG. 8, the first data packet is transmitted to the next LSR along the LSP at a time determined by the SFM 148 on the egress linecard 200c. The SFM 148 facilitates policing and shaping of the LSP according to the LSP parameters stored in the AFB 816.

Post process operations then are performed in operation 1014, which can include processing subsequent data packets of the micro-flow, transmitting LSP utilization information to the ingress linecards, and other post process operations that will be apparent to those skilled in the art.

Figure 11:
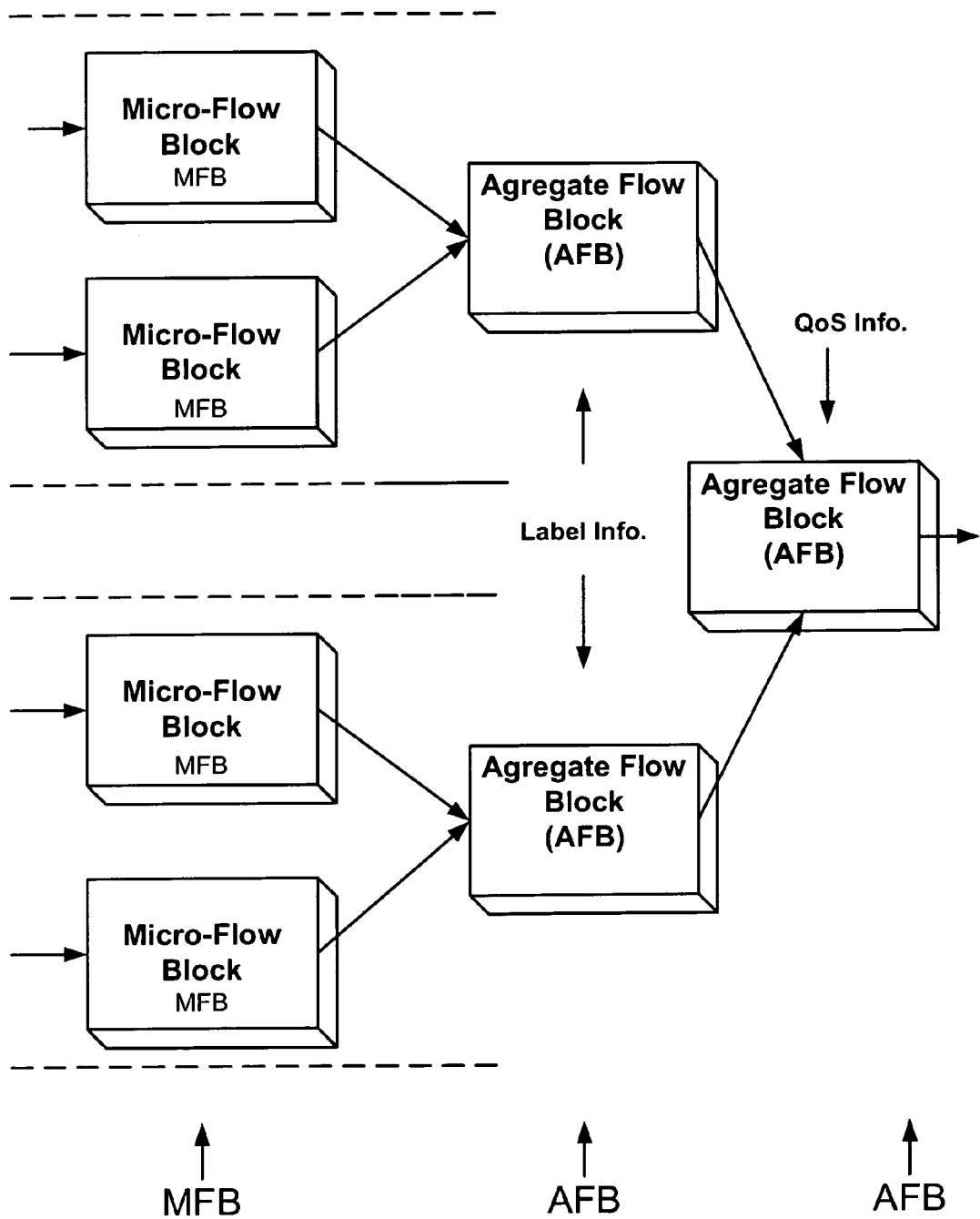
FIG. 11 illustrates an example in which aggregate flow blocks point to aggregate flow blocks, and the last aggregate flow block contains QoS information, in accordance with an embodiment of the present invention.

FIG. 11 illustrates another example in which AFBs are used to simplify accounting of flow blocks over a circuit. Normally, a micro-flow block (MFB) contains all the information necessary for a flow, e.g., QoS information, express port information, etc. In a circuit situation (e.g., LSP, PVC, etc.), we need to treat many (potentially 1000's) of micro-flows the same, i.e., sharing bandwidth, same flow characteristics, etc. To treat them the same, the micro-flow blocks (MFBs) are configured to point at an aggregate flow block (AFB) which contains information that normally is held in the micro-flow block (i.e., QoS information, etc.), as well as information pertinent to the type of aggregate flow it describes. For an MPLS LSP, it would also contain label information—outgoing label, label action (pop, push, scrap). Likewise, for Frame Relay VC, it would contain DLCI information. In an optional embodiment, the aggregate information can be cached back into the microflow block for efficiency reasons.

As a packet comes in, a look-up is performed based on its header fields, and the look-up points to a micro-flow block, which in turn points to an aggregate flow-block which gives flow characteristics. Another important benefit of the AFB is stats collection. Normally, all stats for a micro-flow are held in the micro-flow block. In a circuit situation though, that would require access many (1000's) of the micro-flow blocks, thus adding stats as we go in order to get stats for a circuit. Instead, all stats are kept in the AFB-single update location.

AFBs also provide an efficient way of enabling resource sharing between circuits (e.g., much like sharing resources between micro-flows). To share resources, an AFB can simply contain a pointer to another AFB. For instance, if two LSPs are provided, and there is a desire to share bandwidth resources. The micro-flow blocks would contain a pointer to their respective LSPs' AFBs as shown in FIG. 11, and the AFBs would contain a pointer to a third AFB which contains all necessary QoS information. In one embodiment, the LSP AFBs could contain different label information (different labels to swap), but combined they are not to exceed a certain amount of bandwidth which is managed by the third AFB.

Although the foregoing embodiments of the present invention have been described in some detail for purposes of clarity of understanding, it will be apparent that certain changes and modifications may be practiced within the scope of the appended claims. For example, in an alternative embodiment, several AFBs (e.g., with similar QoS characteristics), rather than several micro-flows (e.g., with similar QoS characteristics), can be associated with a separate AFB and processed fittingly. Accordingly, the present embodiments are to be considered as illustrative and not restrictive, and the invention is not to be limited to the details given herein, but may be modified within the scope and equivalents of the appended claims.

What is claimed is:

1. A method for network tunneling utilizing flow state information, comprising the operations of:
   creating a flow block having flow state information for a received first data packet of a micro-flow;
   storing a tunnel identifier for the micro-flow in the flow block, the tunnel identifier identifying a selected network tunnel to be used to transmit the data packet;
   indexing an aggregate flow block using the tunnel identifier, the aggregate flow block having tunnel specific information for the selected network tunnel; and
   transmitting the data packet using the selected network tunnel based on the tunnel specific information;
   wherein statistics for the selected network tunnel are stored using the aggregate flow block.

2. A method as recited in claim 1, wherein the statistics include utilization statistics for the selected network tunnel.

3. A method as recited in claim 1, wherein the first data packet is received at a particular ingress linecard.

4. A method as recited in claim 3, wherein the ingress linecard sends the first data packet to a particular output port of a network tunnel multi-link interface based on utilization of the output port.

5. A method as recited in claim 4, wherein the ingress linecard sends the first data packet to the output port having the least utilization.

6. A method as recited in claim 1, further comprising the operation of storing the tunnel specific information obtained from the aggregate flow block in the created flow block.

7. A method as recited in claim 6, wherein the tunnel specific information includes at least one of an outgoing label, and an outgoing layer 2 type for an egress router.

8. A method as recited in claim 7, further including the operation of transmitting a subsequent data packet based on the tunnel specific information stored in the flow block.

9. A router capable of network tunneling utilizing flow state information, comprising:
   an aggregate flow block having tunnel specific information for a particular network tunnel; and
   a flow block having flow state information for a micro-flow, the flow block further including an identifier that associates the flow block with the aggregate flow block;
   wherein the aggregate flow block stores statistics for the particular network tunnel.

10. A router as recited in claim 9, wherein the aggregate flow block includes an outgoing label associated with the particular network tunnel.

11. A router as recited in claim 10, wherein the aggregate flow block includes a label action associated with the particular network tunnel.

12. A router as recited in claim 11, wherein the outgoing label and the label action are copied from the aggregate flow block to the flow block upon creation of the flow block.

13. A router as recited in claim 11, further comprising a plurality of aggregate flow blocks, each aggregate flow block being associated with a separate network tunnel.

14. A router as recited in claim 13, further comprising a plurality of flow blocks, each flow block associated with a separate micro-flow.

15. A router as recited in claim 14, wherein the plurality of flow blocks includes flow state information for a particular micro-flow.

16. A router as recited in claim 9, wherein the statistics include utilization statistics for the particular network tunnel.

17. A method for network tunneling utilizing flow state information, comprising the operations of:
   receiving a first data packet of a micro-flow at an ingress linecard of a router;
   creating a flow block having flow state information for a received first data packet of a micro-flow;
   storing a tunnel identifier for the micro-flow in the flow block, the tunnel identifier identifying a selected network tunnel to be used to transit the data packet;
   determining a particular output port on a specific egress linecard for transmitting the micro-flow;
   transmitting the first data packet to the specific egress linecard;
   indexing an aggregate flow block using the tunnel identifier, the aggregate flow block having tunnel specific information for the selected network tunnel; and
   transmitting the data packet along the selected network tunnel using the particular output port based on the tunnel specific information;
   wherein statistics for the selected network tunnel are stored using the aggregate flow block.

18. A method as recited in claim 17, wherein the particular output port is a least utilized output port associated with the selected network tunnel.

19. A method as recited in claim 17, wherein the particular output port is determined based on time.

20. A method as recited in claim 17, wherein the statistics include utilization statistics for the selected network tunnel.

21. A method as recited in claim 17, further comprising the operation of storing the tunnel specific information obtained from the aggregate flow block in the created flow block.

22. A method as recited in claim 21, wherein the tunnel specific information includes an outgoing label.

23. A method as recited in claim 22, further including the operation of transmitting a subsequent data packet based on the tunnel specific information stored in the flow block.

24. A router capable of network tunneling utilizing flow state information, comprising:
   an ingress linecard having logic that selects a particular network tunnel for a received micro-flow, the ingress linecard further including logic that selects a particular egress linecard and a particular port to utilize for transmission of the micro-flow;
   an aggregate flow block having tunnel specific information for the selected network tunnel, the aggregate flow block further including statistics for the selected network tunnel; and
   a flow block having flow state information for the micro-flow, the flow block further including an identifier that associates the flow block with the aggregate flow block.

25. A router as recited in claim 24, wherein the aggregate flow block includes an outgoing label associated with the particular network tunnel.

26. A router as recited in claim 25, wherein the aggregate flow block includes a label action associated with the particular network tunnel.

27. A router as recited in claim 26, wherein the outgoing label and the label action are copied from the aggregate flow block to the flow block upon creation of the flow block.

28. A router as recited in claim 24, wherein the statistics include utilization statistics for the selected network tunnel.

29. A router as recited in claim 24, further comprising a plurality of aggregate flow blocks, each aggregate flow block being associated with a separate network tunnel.

30. A router as recited in claim 29, further comprising a plurality of flow blocks, each flow block associated with a separate micro-flow.

31. A router as recited in claim 30, wherein the plurality of flow blocks includes flow state information for a particular micro-flow.

32. A method for network tunneling utilizing flow state information, comprising the operations of:

receiving a first data packet of a micro-flow at an ingress linecard of a router;

creating a flow block having flow state information for a received first data packet of a micro-flow;

storing an aggregate flow block tunnel identifier for the micro-flow in the flow block, the aggregate flow block tunnel identifier identifying a selected network tunnel to be used to transmit the data packet;

determining a particular output port on a specific egress linecard for transmitting the micro-flow, the particular output port is determined from the aggregate flow block tunnel identifier; and transmitting the first data packet and all subsequent data packets to the specific egress linecard using the aggregate flow block tunnel identifier;

wherein statistics for the selected network tunnel are stored using the aggregate flow block tunnel identifier.

* * * * *